US006569511B1

(12) United States Patent
Smith et al.

(10) Patent No.: US 6,569,511 B1
(45) Date of Patent: May 27, 2003

(54) RECORDING SHEETS WITH LIGHTFASTNESS-ENHANCING SILOXANES

(75) Inventors: Thomas W. Smith, Penfield, NY (US); Kathleen M. McGrane, Webster, NY (US)

(73) Assignee: Xerox Corporation, Stamford, CT (US)

( * ) Notice: Subject to any disclaimer, the term of this patent is extended or adjusted under 35 U.S.C. 154(b) by 28 days.

(21) Appl. No.: 10/002,342

(22) Filed: Nov. 15, 2001

(51) Int. Cl.$^7$ .................................................. B32B 3/00

(52) U.S. Cl. ........................ 428/195; 347/105; 428/447

(58) Field of Search ................................ 428/195, 446, 428/447; 347/105, 106

(56) References Cited

U.S. PATENT DOCUMENTS

| | | | | | |
|---|---|---|---|---|---|
| 4,256,493 | A | * | 3/1981 | Yokoyama et al. | 106/22 |
| 5,089,250 | A | * | 2/1992 | Forestier et al. | 424/43 |
| 5,610,257 | A | * | 3/1997 | Richard et al. | 528/15 |
| 5,643,356 | A | * | 7/1997 | Nohr et al. | 106/31.49 |
| 5,686,633 | A | * | 11/1997 | Vieira et al. | 549/434 |
| 5,719,204 | A | * | 2/1998 | Beach et al. | 523/161 |
| 6,106,599 | A | * | 8/2000 | Breton et al. | 106/31.29 |
| 6,124,376 | A | * | 9/2000 | Nichols et al. | 523/160 |
| 6,142,618 | A | * | 11/2000 | Smith et al. | 347/85 |
| 6,200,369 | B1 | * | 3/2001 | Schwarz | 106/31.43 |
| 6,270,214 | B1 | * | 8/2001 | Smith et al. | 347/101 |

FOREIGN PATENT DOCUMENTS

| | | | |
|---|---|---|---|
| EP | 0867486 | * | 9/1998 |
| JP | 10007958 | * | 1/1998 |
| JP | 10007969 | * | 1/1998 |
| JP | 10-278435 | * | 10/1998 |
| JP | 11-099740 | * | 4/1999 |
| JP | 2000-141875 | * | 5/2000 |
| WO | WO 97/20000 | * | 6/1997 |

OTHER PUBLICATIONS

Copending Application U.S. Ser. No. (not yet assigned), filed concurrently herewith, entitled "Aqueous Inks Containing Lightfastness–Enhancing Siloxanes," by Thomas W. Smith et al.*

Copending Application U.S. Ser. No. (not yet assigned), filed concurrently herewith, entitled "Photoprotective and Lightfastness–Enhancing Siloxanes," by Thomas W. Smith et al.*

* cited by examiner

*Primary Examiner*—Bruce H. Hess
*Assistant Examiner*—Michael E. Grendzynski
(74) *Attorney, Agent, or Firm*—Judith L. Byorick

(57) ABSTRACT

Disclosed is a recording sheet which comprises a substrate and an image-receiving coating situated on at least one surface of the substrate, said image-receiving coating being suitable for receiving images of an aqueous ink, said image-receiving coating comprising a lightfastness agent which is a polysiloxane having thereon a hydrophilic moiety and a lightfastness moiety.

20 Claims, No Drawings

RECORDING SHEETS WITH LIGHTFASTNESS-ENHANCING SILOXANES

Copending Application U.S. Ser. No. 10/001,572, filed concurrently herewith, entitled "Photoprotective and Lightfastness-Enhancing Siloxanes," with the named inventors Thomas W. Smith and Kathleen M. McGrane, the disclosure of which is totally incorporated herein by reference, discloses a compound of one of the formulae

I

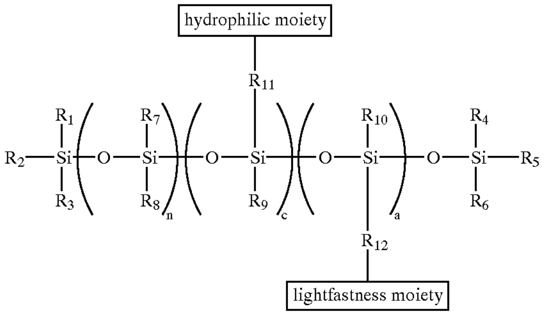

II

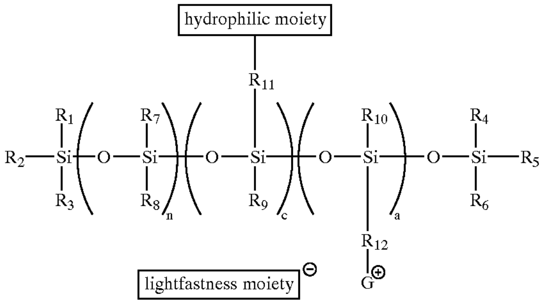

III

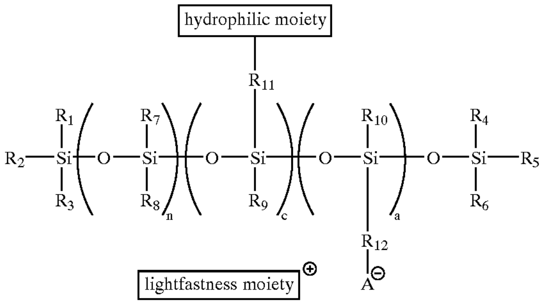

IV

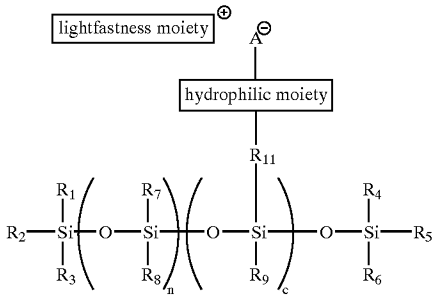

or

-continued

V

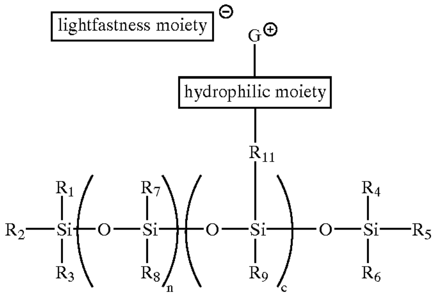

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat $—OSi(R_7)(R_8)—$ monomer units, a is an integer representing the number of repeat $—OSi(R_{10})(R_{12}$-lightfastness moiety)— monomer units, and c is an integer representing the number of repeat $—OSi(R_9)(R_{11}$-hydrophilic moiety)— monomer units.

Copending Application U.S. Ser. No. 10/001,741, filed concurrently herewith, entitled "Aqueous Inks Containing Lightfastness-Enhancing Siloxanes," with the named inventors Thomas W. Smith and Kathleen M. McGrane, the disclosure of which is totally incorporated herein by reference, discloses an ink composition which comprises water, a colorant, and a lightfastness agent which is a polysiloxane having thereon a hydrophilic moiety and a lightfastness moiety. Also disclosed are printing processes using the ink.

BACKGROUND OF THE INVENTION

The present invention is directed to recording sheets suitable for receiving images of an aqueous ink. More specifically, the present invention is directed to recording sheets which enhance the lightfastness of images generated thereon. One embodiment of the present invention is directed to a recording sheet which comprises a substrate and an image-receiving coating situated on at least one surface of the substrate, said image-receiving coating being suitable for receiving images of an aqueous ink, said image-receiving coating comprising a lightfastness agent of one of the formulae

I

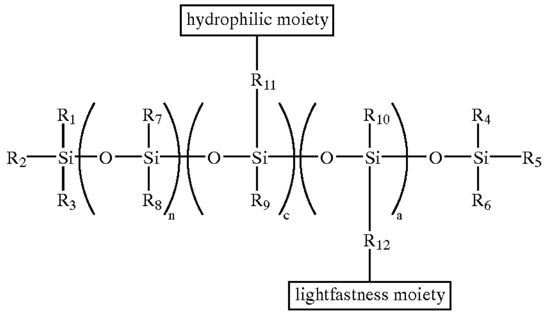

-continued

II

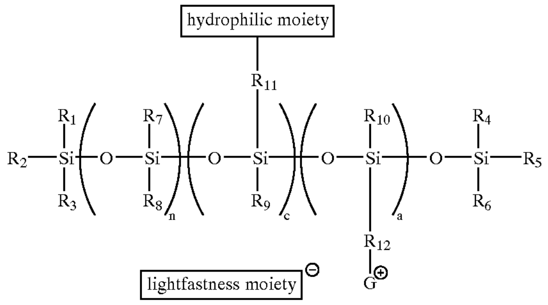

III

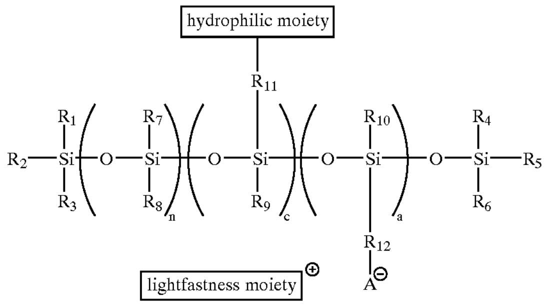

IV

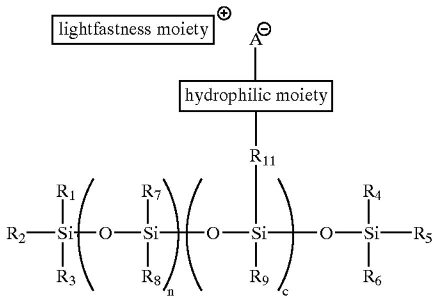

or

V

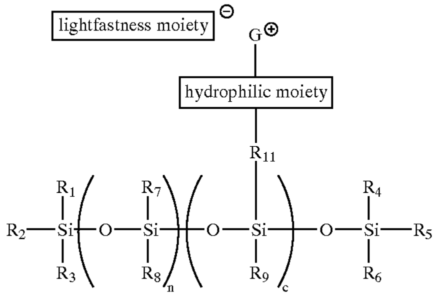

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat $—OSi(R_7)(R_8)—$ monomer units, a is an integer representing the number of repeat $—OSi(R_{10})(R_{12}$-lightfastness moiety)— monomer units, and c is an integer representing the number of repeat $—OSi(R_9)(R_{11}$-hydrophilic moiety)— monomer units.

Compositions for imparting lightfastness to recording substrates containing images are known, including block or graft copolymers of dialkylsiloxanes and polar, hydrophilic monomers capable of interacting with an ink colorant to cause the colorant to become complexed, laked, or mordanted; organopolysiloxane copolymers having functional side groups capable of interacting with an ink colorant to cause the colorant to become complexed, laked, or mordanted; perfluorinated polyalkoxy polymers; perfluoroalkyl surfactants having thereon at least one group capable of interacting with an ink colorant to cause the colorant to become complexed, laked, or mordanted; and the like.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Other known droplet ejectors include those of the type disclosed in, for example, U.S. Pat. No. 6,127,198, the disclosure of which is totally incorporated herein by reference.

U.S. Pat. No. 6,270,214 (Smith et al.), the disclosure of which is totally incorporated herein by reference, discloses a process which comprises (a) applying to a substrate a fixing fluid which comprises a material selected from the group consisting of (1) block or graft copolymers of dialkylsiloxanes and polar, hydrophilic monomers capable of interacting with an ink colorant to cause the colorant to become complexed, laked, or mordanted, (2) organopolysiloxane copolymers having functional side groups capable of interacting with an ink colorant to cause the colorant to become complexed, laked, or mordanted, (3) perfluorinated polyalkoxy polymers, (4) perfluoroalkyl surfactants having thereon at least one group capable of interacting with an ink colorant to cause the colorant to become complexed, laked, or mordanted, and (5) mixtures thereof; (b) incorporating into an ink jet printing apparatus an ink composition which comprises water and a colorant which becomes complexed, laked, or mordanted upon contacting the fixing fluid; and (c) causing droplets of the ink composition to be ejected in an imagewise pattern onto the substrate.

U.S. Pat. No. 6,142,618 (Smith et al.), the disclosure of which is totally incorporated herein by reference, discloses a fluid deposition apparatus comprising (a) a fluid supply, (b) a porous fluid distribution member in operative connection with the fluid supply, enabling wetting of the fluid distribution member with a fluid, and (c) a porous metering membrane situated on the fluid distribution member, whereby the metering membrane enables uniform metering of the fluid from the fluid distribution member onto a substrate.

U.S. Pat. No. 6,124,376 (Nichols et al.), the disclosure of which is totally incorporated herein by reference, discloses a process which comprises incorporating into an ink jet printing apparatus an ink composition which comprises water, a colorant, and a polymer of the formula

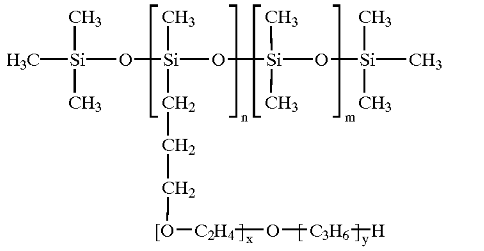

wherein m, n, x, and y are each integers representing the number of repeat monomer units, and wherein the ratio of x:y is from about 10:90 to about 90:10, and causing droplets of the ink to be ejected in an imagewise pattern onto a recording sheet.

U.S. Pat. No. 6,200,369 (Schwarz), the disclosure of which is totally incorporated herein by reference, discloses an ink composition which comprises (a) water, (b) a colorant; and (c) an additive selected from the group consisting of diamido quaternary dialkyl ammonium salts, bitail quaternary tetraalkyl ammonium salts, bitail imidazolium salts, bitail biomimetic phospholipid salts, specific bisquaternary salts, β-hydroxyethyl ethylene diamine fatty acids, specific polyammonium salts, ethoxylated polyamine compounds, biquaternary pyridinium salts, aminofunctional polyorganosiloxanes, and mixtures thereof.

U.S. Pat. No. 6,106,599 (Breton et al.), the disclosure of which is totally incorporated herein by reference, discloses an ink composition comprising (1) an azole compound, (2) a viscosity compound, (3) a lightfastness component, (4) an antioxidant, and (5) a colorant.

U.S. Pat. No. 5,719,204 (Beach et al.), the disclosure of which is totally incorporated herein by reference, discloses polymeric dispersants used in formulating aqueous ink compositions, as well as inks containing those dispersants. The dispersants are graft copolymers comprising a hydrophilic polymeric segment, a hydrophobic polymeric segment incorporating a hydrolytically-stable siloxyl substituent, and a stabilizing segment, such as a reactive surfactant macromer, a protective colloid macromer, or a non-siloxyl hydrophobic monomer. The inks made with these dispersants show excellent stability, print characteristics, waterfastness, light-fastness, optical density, and in-use maintenance characteristics.

U.S. Pat. No. 5,686,633 (Vieira et al.), the disclosure of which is totally incorporated herein by reference, discloses a recording material for ink jet printing comprising a carrier having a surface which can be printed on or a carrier coated on one side with a material which can be printed on, wherein the carrier or the coating contains as a stabilizer at least one compound of the formula

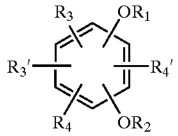

in which $R_1$ and $R_2$ independently of one another are $C_1$–$C_4$ alkyl which is unsubstituted or substituted by one or two —OH, —$COO^-M^+$ and/or —$SO_3^-M^+$ groups, $C_3$–$C_5$ alkenyl, $C_3$–$C_5$ alkynyl,

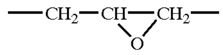

—$CH_2CH(OH)CH_2$—$SO_3^-M^+$, —CO-alkyl($C_1$–$C_4$) which is unsubstituted or substituted by —$COOR^o$ or —CO—N($R_5$)($R_6$) or, if $OR_1$ and $OR_2$ are in the ortho position relative to one another, $R_1$ and $R_2$ together are $C_1$–$C_6$ alkylene, $M^+$ being $H^+$, a monovalent, divalent or trivalent metal cation or a group $(R_{12}')N^+(R_{12}'')(R_{13}')(R_{14}')$, wherein $R_{12}'$, $R_{12}''$, $R_{13}$ and $R_{14}$ independently of one another are H, $C_1$–$C_4$ alkyl which is unsubstituted or substituted by 1 or 3 OH, $C_1$–$C_4$ alkyl interrupted by O, allyl, cyclopentyl, cyclohexyl, phenyl, benzyl or tolyl, or $R_1$ is a group

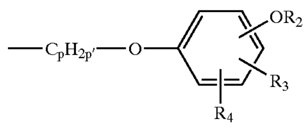

in which p' is a number from 2 to 6, $R_5$ and $R_6$ independently of one another are H or $C_1$–$C_4$ alkyl which is unsubstituted or substituted by an OH, $COOR^o$, —$COO^-M^+$, $SO_3^-M^+$, $P(O)(O—M^+)_2$ or $P(O)(OR^o)_2$ group, $R_3'$ and $R_4'$ independently of one another are H, $C_1$–$C_4$ alkyl, OH or $C_1$–$C_4$ alkoxy, $R_3$ and $R_4$ independently of one another are H, halogen, —$OR_7$, —$COOR^o$, —$COO^-M^+$, —OOC—$R_5$, —CO—N($R_5$)($R_6$), —($R_5$)N—CO—$R_6$, —CO—$R_5$, —$SO_3^-M^+$, —$SO_2N(R_5)(R_6)$, $P(OR_5)_3$, —(O)P—(O—$M^+)_2$, —(O)P—$(OR^o)_2$, $C_1$–$C_8$ alkyl which is unsubstituted or substituted by 1 to 7—$OR_5$ or —OO—C—$R_5$ groups, by 1 or 2—$COOR^o$, —COO—$M^+$, or —CO—N($R_5$)($R_6$) groups or by one or two —$SO_3^-M^+$, —$SO_2N(R_5)(R_6)$ or —(O)P—$(OR^o)_2$ or —(O)P(O—$M^+)_2$ groups, where $M^+$, $R_5$ and $R_6$ are as defined above, or $C_5$–$C_6$ cycloalkyl or allyl, $R^o$ being $C_1$–$C_4$ alkyl which is unsubstituted or substituted by an —OH group or —$(CH_2CH_2O)_r$—H in which r is 1 to 12, and $R_7$ being $C_1$–$C_4$ alkyl or —CO-alkyl($C_1$–$C_4$) each of which is unsubstituted or substituted by 1 or 2 —OH groups or $R_3$ and $R_4$ independently of one another are one of the groups

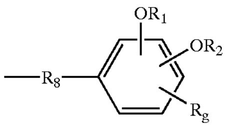

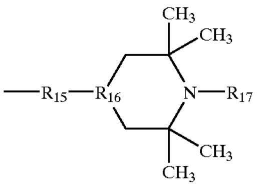

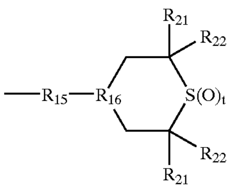

in which $R_8$ is a direct bond or methylene, $R_9$ is H, $C_1$–$C_8$ alkyl, $—COO^-M^+$ or $—SO_3^-M^+$, where $M^+$, $R_1$ and $R_2$ are as defined above, $R_{15}$ is —CO—, $—(O)_g—C_pH_{2p}—CO—$, $—OOC—C_pH_{2p}—$, $—COO—C_pH_{2p}—$, $—O—CH_2CH(OH)—CH_2—$ or

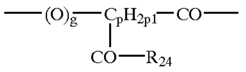

in which g is 0 or 1 and p is 1 to 6 and $R_{24}$ is $—OR_5$, $—N(R_5)(R_6)$ or a group

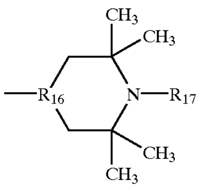

and $R_{16}$ is one of the following radicals:

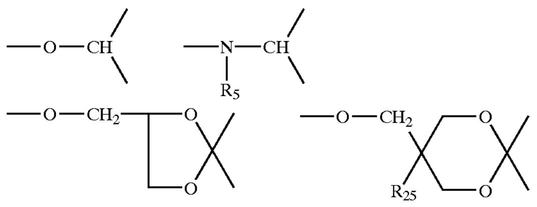

in which $R_{25}$ is H or $C_1$–$C_4$ alkyl, $R_{17}$ is H, $C_1$–$C_4$ alkyl which is unsubstituted or substituted by an —OH group, $—CH_2—CH(OH)—CH_2—OH$, $C_1$–$C_4$ alkoxy, —OH, $—CO\text{-alkyl}(C_1–C_4)$, $—COCH{=}CH_2$, allyl, benzyl or a group

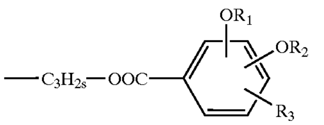

in which s is the number 2 or 3, t is a number from 0 to 2 and $R_{21}$ and $R_{22}$ independently of one another are H, $C_1$–$C_4$ alkyl or phenyl.

U.S. Pat. No. 5,643,356 (Nohr et al.), the disclosure of which is totally incorporated herein by reference, discloses an improved ink suitable for ink jet printing comprising a mixture of a colorant, an arylketoalkene stabilizing compound or a photoreactor, and a liquid vehicle, wherein the colorant is light-stable. When the photoreactor is combined with a wavelength-selective sensitizer to form a radiation transorber, the colorant is mutable upon exposure of the radiation transorber to specific, narrow bandwidth radiation. The colored composition may also contain a molecular includant having a chemical structure which defines at least one cavity wherein each of the colorant and photoreactor or radiation transorber is associated with the molecular includant. The invention also includes ink jet print cartridges containing the improved ink, ink jet printers containing the improved ink and methods of printing using the improved ink.

U.S. Pat. No. 5,610,257 (Richard et al.), the disclosure of which is totally incorporated herein by reference, discloses topically applicable sunscreen/cosmetic compositions well suited for enhanced photoprotection of human skin and/or hair against the damaging effects of UV-A and UV-B irradiation, particularly solar radiation, which comprise a photoprotecting effective amount of a novel benzotriazole-substituted polyorganosiloxane/polyorganosilane having one of the formulae (1) to (3):

(1)

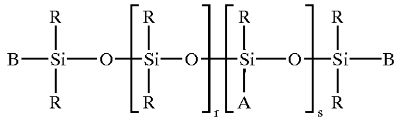

(2)

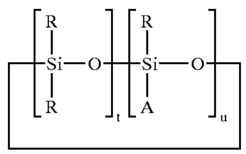

wherein A is a monovalent benzotriazole radical which comprises an acrylate or acrylamide functional group, which is bonded directly to a silicon atom, and which has the formula (4):

(4)

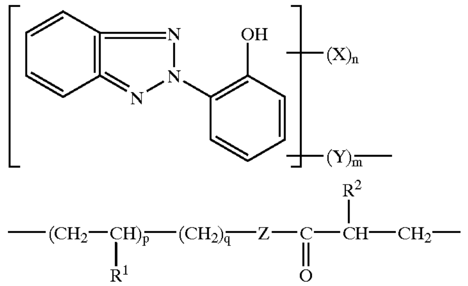

U.S. Pat. No. 5,089,250 (Forestier et al.), the disclosure of which is totally incorporated herein by reference, discloses the cosmetic use, in particular for use as a UV filter, of benzotriazole diorganopolysiloxanes having either formula:

(1)

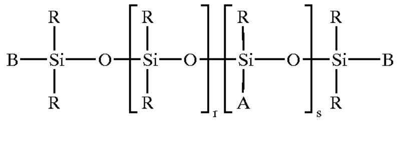

where R is $C_1$–$C_{10}$ alkyl, phenyl, or 3,3,3-trifluoropropyl, B is R or A, r=0–200, s=0–50, or formulas:

(2)

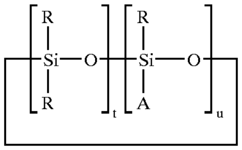

where u=1–20, t=0–20 and t+u≧3. A and/or B represent a benzotriazole $C_3$–$C_{12}$ alkylene which may be substituted.

U.S. Pat. No. 4,256,493 (Yokoyama et al.), the disclosure of which is totally incorporated herein by reference, discloses a jet ink composition which comprises an aqueous jet ink containing a water-soluble dye, a wetting agent, and water as main components and, incorporated therein, a water-soluble ultraviolet absorbing agent as well as a metal salt, when necessary.

PCT Application WO 97/20000 (Nohr et al.), the disclosure of which is totally incorporated herein by reference, discloses colorant stabilizers and a colorant composition which includes a colorant and a colorant stabilizer. The colorant stabilizer imparts light stability to the colorant so that the colorant does not fade when exposed to electromagnetic radiation such as sunlight or artificial light.

European Patent Application EP 0867486 (Gangal et al.), the disclosure of which is totally incorporated herein by reference, discloses a jet printing ink composition which results in reduced drop misdirection and missing nozzles. The aqueous-based ink composition includes at least one colorant; a wetting agent; and a co-solvent comprising a substituted or unsubstituted lactam, an amide, or mixtures thereof.

Japanese Patent Publication JP 10278435, the disclosure of which is totally incorporated herein by reference, discloses a thermal recording medium having excellent recording traveling properties with excellent light resistance, heat resistance, and chemical resistance of a recorded part and white part. In the thermal recording medium comprising a thermal recording layer containing colorless or pale basic dye, colorant and a protective layer containing an ultraviolet absorbent sequentially provided on a support, the colorant is 1,1-bis(4-hydroxyphenyl)-1-phenylethane and the absorbent is N,N'-bis(2-hydroxy-3-(2H-benzotriazole-2-il)-5-methylbenzyl)-1,4-benzene-dicarboxyamide.

Japanese Patent Publication JP 11099740, the disclosure of which is totally incorporated herein by reference, discloses an ink jet recording sheet having superior light fastness of a recorded image, particularly superior light fastness of a magenta image, and also superior characteristics such as recording density and recording quality. At least one kind of compound like N-2-(3-(benzotriazole-2-yl)-4-hydroxyphenyl propionyl amino)ethyl-N,N,N-trimethyl ammonium chloride and others by a general formula

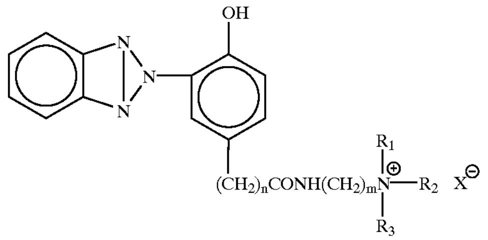

is contained in an ink jet recording sheet for forming a recorded image by using aqueous ink. In the formula, $R_1$, $R_2$, and $R_3$ respectively represent hydrogen atom, $C_1$–$C_4$ alkyl or $C_1$–$C_4$ hydroxyalkyl and X represents organic or inorganic anion. (n) represents 0,1, or 2 and (m) represents an integer of 2 to 6, Japanese Patent Publication JP 2000141875, the disclosure of which is totally incorporated herein by reference, discloses a superior ink jet recording sheet of superior light fastness of a recorded image, particularly light fastness of a magenta image and free from the yellowing of surface, the deterioration of the picture quality and the like. A recorded image is formed on an ink jet recording sheet by using an aqueous ink, and in the recording sheet, at least one kind of benzotrizol compound represented by the formula

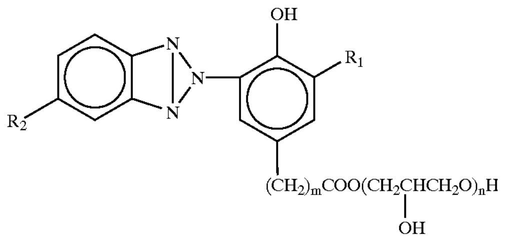

3-(3-(benzotriazol-2-yl)-4-hydroxyphenyl)decaglyceryl propionate or the like is contained in the recording sheet. In the formula, $R_1$ represents a hydrogen atom or a 1–5C alkyl, and $R_2$ represents a hydrogen atom or a chlorine atom. (m) represents 0 or 1–4 integer and (n) represents 1–12 integer.

Japanese Patent Publication JP 10007958, the disclosure of which is totally incorporated herein by reference, discloses an additive for a water based ink which is especially excellent in water resistance and can give a record with a high quality image hardly accompanied by blur of characters or images or border blur at the place where two colors are applied one on top of another. The additive is a polyorganosiloxane-modified amphiphilic polymer which has polyorganosiloxane units and is obtained by copolymerizing a hydrophilic ethylenically unsaturated monomer and a hydrophobic ethylenically unsaturated monomer, or polymerizing an amphiphilic ethylenically unsaturated monomer, in the presence of a polyorganosiloxane having mercaptized organic groups.

Japanese Patent Publication JP 10007969, the disclosure of which is totally incorporated herein by reference, discloses an ink composition excellent in light resistance, water resistance, and water repellency obtained by mixing a compound having a group having the function of stabilizing against ultraviolet rays with a specified amphipathic polymer. The composition is prepared by mixing a polar-solvent-soluble compound having the function of stabilizing against ultraviolet rays (e.g., hydroxyphenylbenzotriazole derivative) with an amphipathic polymer having polyorganosiloxane units, preferably obtained by radical-polymerizing a mixture comprising a hydrophilic ethylenically unsaturated monomer (e.g., acrylamide) and/or an amphipathic ethylenically unsaturated monomer (e.g., methoxypolyethylene glycol monomethacrylate) and optionally a hydrophobic ethylenically unsaturated monomer (e.g., methyl methacrylate) in the presence of an SH-containing polyorganosiloxane.

While known compositions and processes are suitable for their intended purposes, a need remains for improved lightfastness enhancing agents. In addition, a need remains for lightfastness enhancing agents that can be employed on recording substrates to improve the lightfastness of images generated thereon. Further, a need remains for lightfastness enhancing agents that can enhance the lightfastness of images on recording substrates, wherein the lightfastness agent is or becomes closely associated with the recording substrate. Additionally, a need remains for lightfastness enhancing agents that can enhance the lightfastness of images on recording substrates, wherein the lightfastness agent is or becomes closely associated with the colorant in the ink used to generate the images.

SUMMARY OF THE INVENTION

The present invention is directed to a recording sheet which comprises a substrate and an image-receiving coating situated on at least one surface of the substrate, said image-receiving coating being suitable for receiving images of an aqueous ink, said image-receiving coating comprising a lightfastness agent of one of the formulae

I

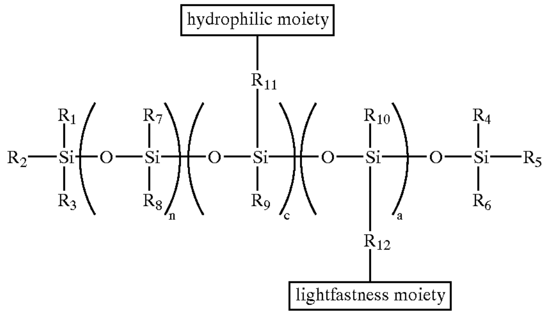

II

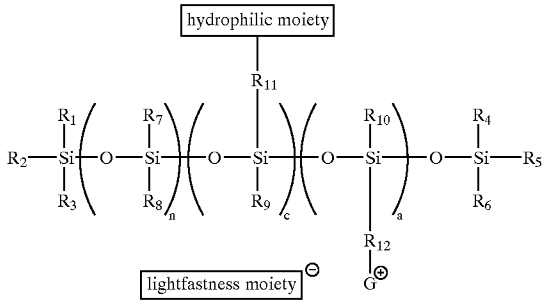

III

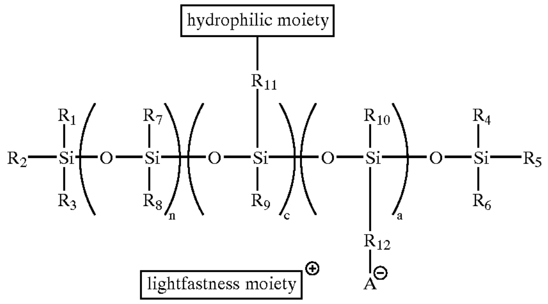

-continued

IV

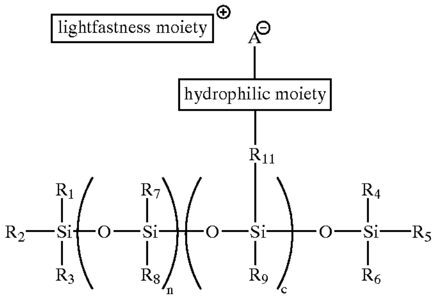

or

V

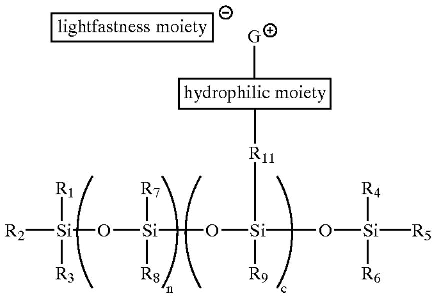

wherein $R_1$, $R_2$, R3, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat —$OSi(R_7)(R_8)$— monomer units, a is an integer representing the number of repeat —$OSi(R_{10})(R_{12}$-lightfastness moiety)— monomer units, and c is an integer representing the number of repeat —$OSi(R_9)(R_{11}$-hydrophilic moiety)— monomer units.

DETAILED DESCRIPTION OF THE INVENTION

The present invention is directed to recording sheets containing compounds of one of the formulae

I

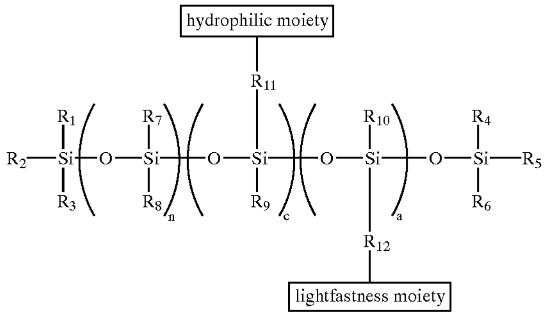

-continued

II

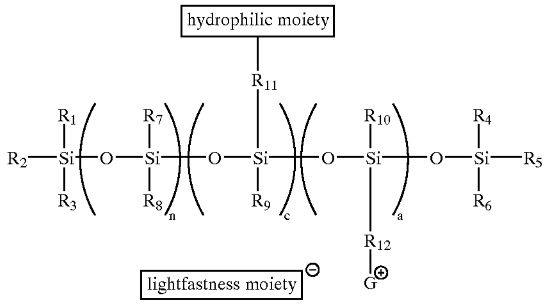

III

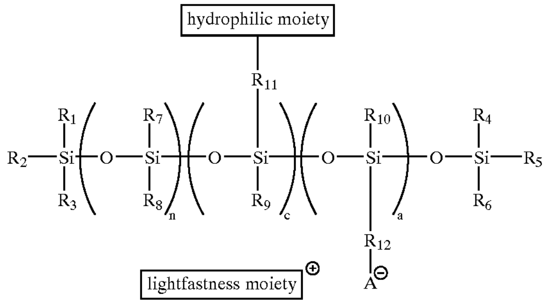

IV

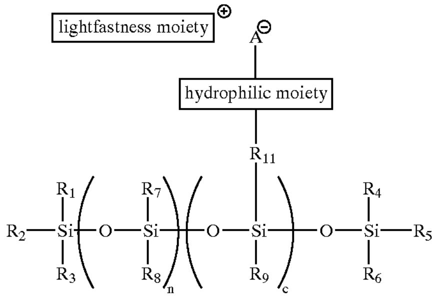

or

V

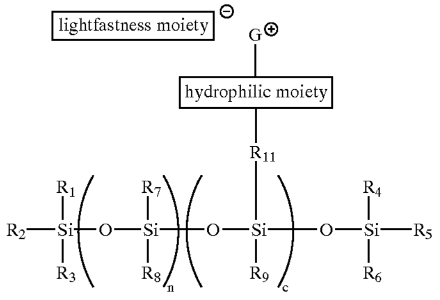

wherein $R_1$, $R_2$, $R_3$, $R_4$, $R_5$, $R_6$, $R_7$, $R_8$, $R_9$, and $R_{10}$ each, independently of the others, is an alkyl group (including linear, branched, cyclic, saturated, unsaturated, and substituted alkyl groups, and wherein hetero atoms, such as oxygen, sulfur, nitrogen, silicon, phosphorus, and the like can be present in the alkyl group), typically with from 1 to about 22 carbons and preferably with from 1 to about 5 carbon atoms, although the number of carbon atoms can be outside of these ranges, an aryl group (including substituted aryl groups), typically with from 6 to about 12 carbon atoms, with 6 carbon atoms being preferred, although the number of carbon atoms can be outside of this range, an arylalkyl group (including substituted arylalkyl groups), typically with from 7 to about 28 carbon atoms, and preferably with from 7 to about 10 carbon atoms, although the number of carbon atoms can be outside of these ranges, or an alkylaryl group (including substituted alkylaryl groups), typically with from 7 to about 28 carbon atoms, and preferably with from 7 to about 10 carbon atoms, although the number of carbon atoms can be outside of these ranges, $R_{11}$ and $R_{12}$ each, independently of the others, is an alkylene group (including linear, branched, cyclic, saturated, unsaturated, and substituted alkylene groups, and wherein hetero atoms, such as oxygen, sulfur, nitrogen, silicon, phosphorus, and the like can be present in the alkylene group), typically with from 1 to about 22 carbons and preferably with from 1 to about 5 carbon atoms, although the number of carbon atoms can be outside of these ranges, an arylene group (including substituted arylene groups), typically with from 6 to about 12 carbon atoms, with 6 carbon atoms being preferred, although the number of carbon atoms can be outside of this range, an arylalkylene group (including substituted arylalkylene groups), typically with from 7 to about 28 carbon atoms, and preferably with from 7 to about 10 carbon atoms, although the number of carbon atoms can be outside of these ranges, or an alkylarylene group (including substituted alkylarylene groups), typically with from 7 to about 28 carbon atoms, and preferably with from 7 to about 10 carbon atoms, although the number of carbon atoms can be outside of these ranges, G is a cationic moiety capable of forming an ionic bond with an anionic lightfastness moiety, such as those of the formula $—NR_{13}R_{14}R_{15}^+$, wherein $R_{13}$, $R_{14}$, and $R_{15}$ each, independently of the others, is a hydrogen atom, an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 22 carbon atoms, and preferably with from 1 to about 7 carbon atoms, although the number of carbon atoms can be outside of this range, and wherein two or more of $R_{13}$, $R_{14}$, and $R_{15}$ can be joined together to form a ring, or the like, with specific examples of cationic groups $—G^+$ and substituents $—R_{12}G^+$ including (but not being limited to)

$—NR_2$ $—NR_3+$

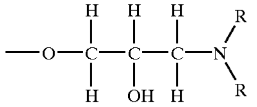

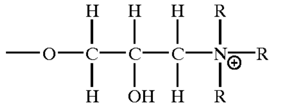

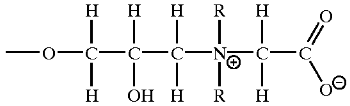

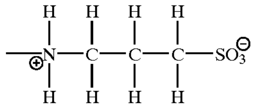

and

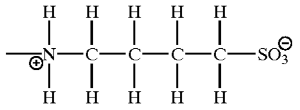

wherein each R, independently of the others, is a hydrogen atom, an alkyl group, including linear, branched, cyclic, substituted, and unsaturated alkyl groups, typically with from 1 to about 22 carbons and preferably with from 1 to about 7 carbon atoms, although the number of carbon atoms can be outside of these ranges, and wherein in a specific embodiment, the R groups are all methyl groups, A is an anionic moiety, such as

—COOH $COO^-$

—OH $—O^-$ $—SO_3H$ $—SO_3^-$ or the like, wherein the substituents on the substituted alkyl, alkylene, aryl, arylene, arylalkyl, arylalkylene, alkylaryl, and alkylarylene groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, cyanopropyl groups, allyl groups, mixtures thereof, and the like, wherein two or more substituents can be joined together to form a ring, n is an integer representing the number of repeat $—OSi(R_7)(R_8)—$ monomer units, typically being from about 3 to about 100, preferably from about 3 to about 50, and more preferably from about 3 to about 20, although the value of n can be outside of these ranges, a is an integer representing the number of repeat $—OSi(R_{10})(R_{12}$-lightfastness moiety)— monomer units, typically being from 1 to about 20, preferably from 1 to about 10, and more preferably from 1 to about 5, although the value of a can be outside of these ranges, and c is an integer representing the number of repeat $—OSi(R_9)$ ($R_{11}$-hydrophilic segment)— monomer units, typically being from 1 to about 50, preferably from 1 to about 20, and more preferably from 1 to about 10, although the value of c can be outside of these ranges. The number average molecular weight of the polymer typically is from about 1,000 to about 50,000, and preferably from about 2,000 to about 20,000, although the value can be outside of these ranges.

Example of suitable lightfastness moieties include 2-(3-(2H-benzotriazol-2-yl)-4-hydroxyphenyl) groups, of the formulae

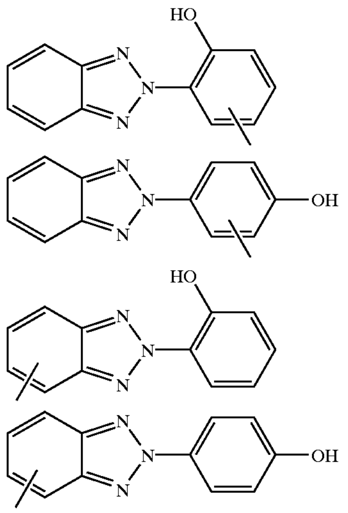

hydroxybenzophenone groups, of the formulae

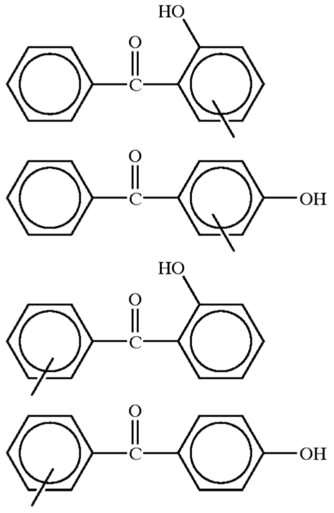

hydroxybenzoic acid groups, of the formula

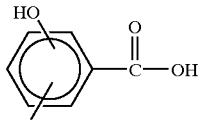

alkoxybenzoc acid groups, of the formula

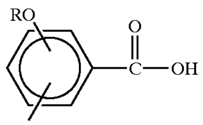

wherein R is an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 22 carbon atoms, preferably with from 1 to about 12 carbon atoms, and more preferably with from 1 to about 6 carbon atoms, although the number of carbon atoms can be outside of these ranges, an aryl group (including substituted aryl groups), typically with from about 6 to about 24 carbon atoms, preferably with from about 6 to about 12 carbon atoms, and more preferably with from about 6 to about 10 carbon atoms, although the number of carbon atoms can be outside of these ranges, an arylalkyl group (including substituted arylalkyl groups), typically with from about 7 to about 25 carbon atoms, preferably with from about 7 to about 13 carbon atoms, and more preferably with from about 7 to about 11 carbon atoms, although the number of carbon atoms can be outside of these ranges, an alkylaryl group (including substituted alkylaryl groups), typically with from about 7 to about 25 carbon atoms, preferably with from about 7 to about 13 carbon atoms, and more preferably with from about 7 to about 11 carbon atoms, although the number of carbon atoms can be outside of these ranges, wherein the substituents on the substituted alkyl, aryl, arylalkyl, and alkylaryl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, cyanopropyl groups, allyl groups, mixtures thereof, and the like, wherein two or more substituents can be joined together to form a ring, esters of substituted benzoic acids, including those of the formula

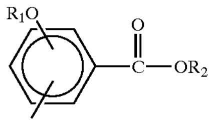

wherein $R_1$ and $R_2$ each, independently of the other, is an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 22 carbon atoms, preferably with from 1 to about 12 carbon atoms, and more preferably with from 1 to about 6 carbon atoms, although the number of carbon atoms can be outside of these ranges, an aryl group (including substituted aryl groups), typically with from about 6 to about 24 carbon atoms, preferably with from about 6 to about 12 carbon atoms, and more preferably with from about 6 to about 10 carbon atoms, although the number of carbon atoms can be outside of these ranges, an arylalkyl group (including substituted arylalkyl groups), typically with from about 7 to about 25 carbon atoms, preferably with from about 7 to about 13 carbon atoms, and more preferably with from about 7 to about 11 carbon atoms, although the number of carbon atoms can be outside of these ranges, an alkylaryl group (including substituted alkylaryl groups), typically with from about 7 to about 25 carbon atoms, preferably with from about 7 to about 13 carbon atoms, and more preferably with from about 7 to about 11 carbon atoms, although the number of carbon atoms can be outside of these ranges, wherein the substituents on the substituted alkyl, aryl, arylalkyl, and alkylaryl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, cyanopropyl groups, allyl groups, mixtures thereof, and the like, wherein two or more substituents can be joined together to form a ring, (hydroxyphenyl)-1,3,5-triazine groups, of the formulae

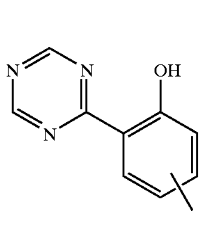

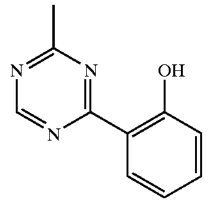

-continued

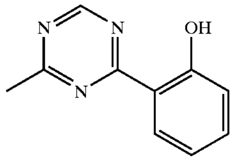

phenylbenzimidazole sulfonic acid groups, of the formulae

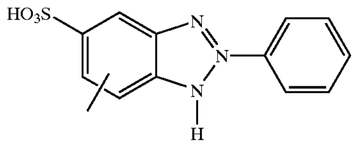

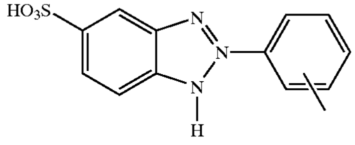

reducing sugar groups, such as raffinose, those of the formula

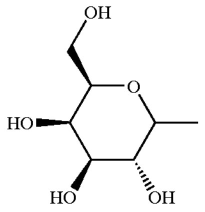

other reducing sugars, and the like.

Examples of suitable anionic lightfastness moieties include (hydroxyphenyl)-benzotriazoles, of the general formulae

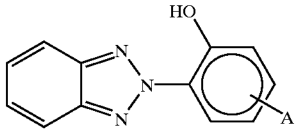

and

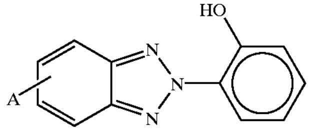

, hydroxybenzophenones, of the general formulae

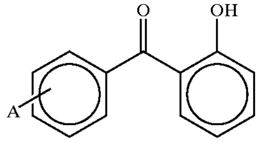

and

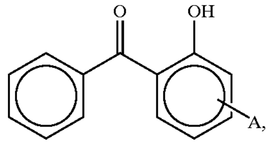

hydroxybenzoic acids, of the general formulae

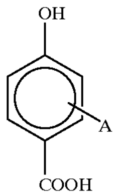

and

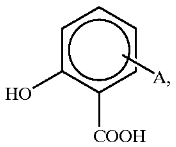

alkoxybenzoic acids, of the general formulae

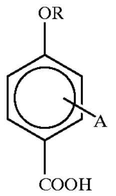

and

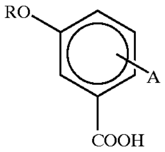

and

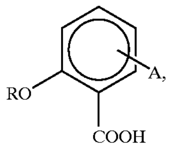

wherein R is an alkyl group, typically with from 1 to about 12 carbon atoms, although the number of carbon atoms can be outside of this range, esters of substituted benzoic acids, of the general formula

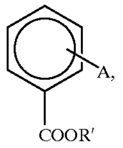

wherein R' is an alkyl group, typically with from 1 to about 12 carbon atoms, although the number of carbon atoms can be outside of this range, (hydroxyphenyl)-1,3,5 triazines, of the general formulae

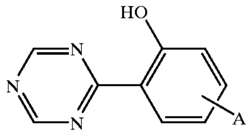

and

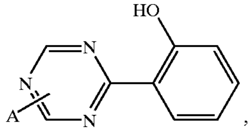

, and the like, wherein in all of the above generic formulae, A is a substituent containing an anionic moiety. A can be either an anionic moiety by itself, such as a carboxylate group, sulfonate group, phosphonate group, or the like, or can be an aliphatic or aromatic group (including aliphatic and aromatic groups containing hetero atoms, such as oxygen, nitrogen, sulfur, silicon, phosphorus, or the like) to which an anionic group is attached. It is to be understood that other substituents can also be present on materials of these formulae. Many compounds in these classes and having ionizable ionic substitutents are commercially available, such as 2-hydroxy-4-methoxybenzophenone-5-sulfonic acid; 2,2'-dihydroxy-4,4'dimethoxybenzophenone-5-sulfonic acid; 2,3-dimethoxybenzoic acid; 3,4-dimethoxybenzoic acid; 3,5-dimethoxybenzoic acid; 2,5-dimethoxybenzoic acid; 2,6-dimethoxybenzoic acid 3,4-dimethoxybenzenesulfonic acid; 3,4,5-trimethoxybenzoic acid; 2,4,5-trimethoxybenzoic acid; 4,5-dimethoxyphthalic acid; 2,3-bis-isopropylidenedioxybenzoic acid; 2,3-bis-(carboxymethyloxy)-benzoic acid; 2,5-dihydroxyphenylacetic acid; and the like, commercially available from sources such as Aldrich Chemical Co., Milwaukee, Wis., and Chem Service Inc., Westchester, Pa. Also suitable are compounds and salts thereof such as those of the following formulae, disclosed in, for example, U.S. Pat. No. 5,686,633, the disclosure of which is totally incorporated herein by reference:

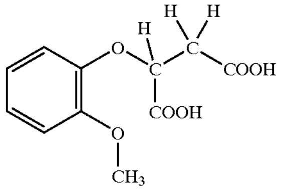

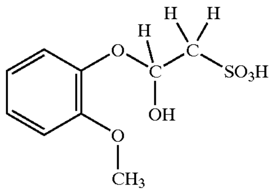

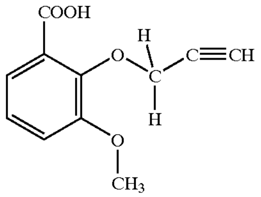

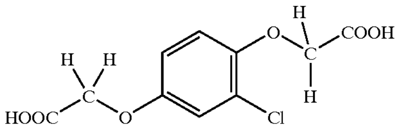

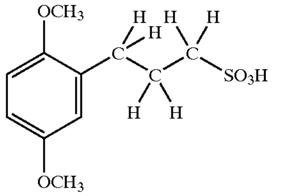

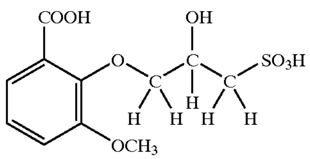

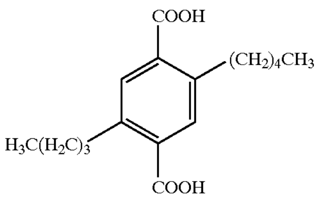

-continued

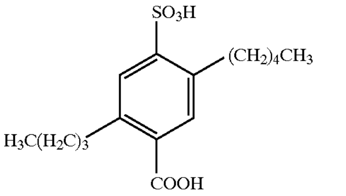

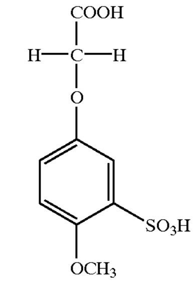

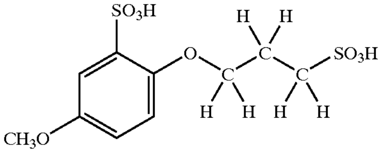

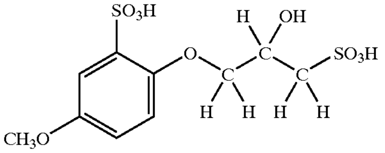

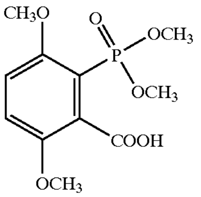

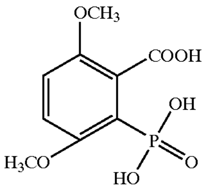

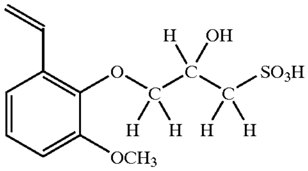

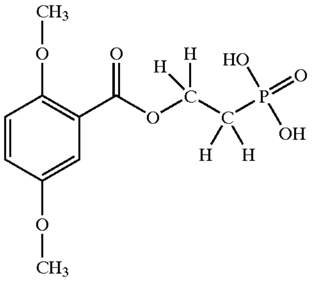

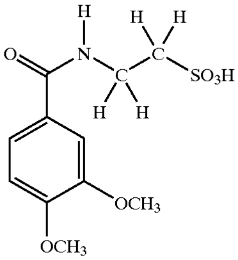

-continued

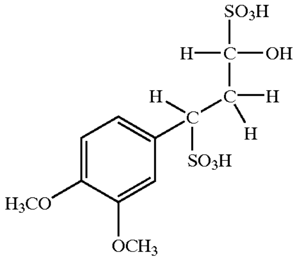

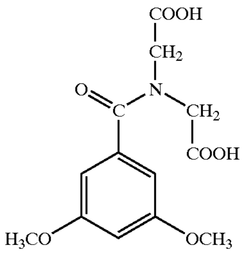

and the like, as well as mixtures thereof. Materials of these formulae can be prepared as disclosed in, for example, U.S. Pat. No. 5,686,633, the disclosure of which is totally incorporated herein by reference.

Examples of suitable cationic lightfastness moieties include (but are not limited to) 2-(3-(2H-benzotriazol-2-yl)-4-hydroxyphenyl) quaternary compounds, of the general formulae

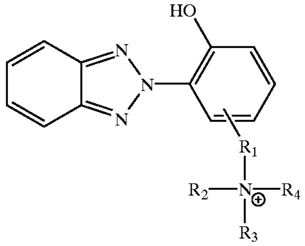

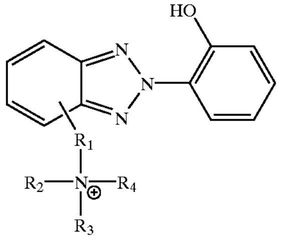

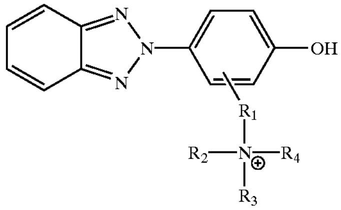

or

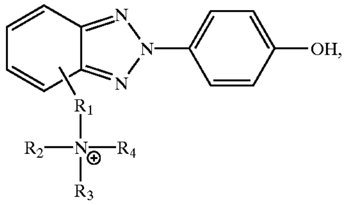

, hydroxybenzophenone quaternary compounds, of the general formulae

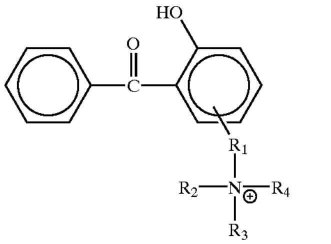

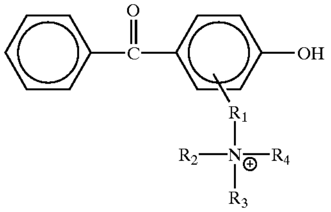

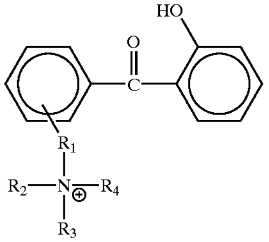

or

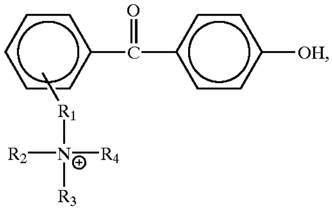

quaternary ammonium derivatives of dialkylaminobenzoates, of the general formula

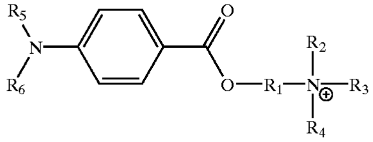

wherein $R_5$ and $R_6$ each, independently of the other, is an alkyl group, typically with from 1 to about 6 carbon atoms, although the number of carbon atoms can be outside of this range, or an arylalkyl group, typically with from about 7 to about 12 carbon atoms, such as a benzyl group, although the number of carbon atoms can be outside of this range, and the like, wherein $R_1$ is an alkylene group (including linear, branched, saturated, cyclic, and substituted alkylene groups, and
wherein hetero atoms, such as oxygen, sulfur, nitrogen, silicon, phosphorus, or the like, can be placed between the carbon atoms in the alkylene group), typically with from 1 to about 10 carbon atoms, and preferably with from 1 to about 4 carbon atoms, although the number of carbon atoms can be outside of this range, an arylalkylene group (including substituted arylalkylene groups), typically with from 7 to about 20 carbon atoms, more preferably with from 7 to about 13 carbon atoms, although the number of carbon atoms can be outside of this range, or a polyalkyleneoxy group (including substituted polyalkyleneoxy groups), typically polyethyleneoxy groups or polypropyleneoxy groups, typically with from 2 to about 22 repeat alkyleneoxy units, and preferably with from 2 to about 10 repeat alkyleneoxy units, although the number of repeat alkyleneoxy units can be outside of these ranges, and $R_2$, $R_3$, and $R_4$ each, independently of the others, is a hydrogen atom, an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 10 carbon atoms, and preferably with from 1 to about 4 carbon atoms, although the number of carbon atoms can be outside of this range, an aryl group (including substituted aryl groups), typically with from 6 to about 18 carbon atoms, more preferably with from 6 to about 12 carbon atoms, although the number of carbon atoms can be outside of this range, an arylalkyl group (including substituted arylalkyl groups), typically with from 7 to about 20 carbon atoms, more preferably with from 7 to about 13 carbon atoms, although the number of carbon atoms can be outside of this range, an alkylaryl group (including substituted alkylaryl groups), typically with from 7 to about 20 carbon atoms, more preferably with from 7 to about 13 carbon atoms, although the number of carbon atoms can be outside of this range, an alkoxy group (including substituted alkoxy groups), typically with from 1 to about 10 carbon atoms, and preferably with from 1 to about 4 carbon atoms, although the number of carbon atoms can be outside of this range, or a polyalkyleneoxy group (including substituted polyalkyleneoxy groups), typically polyethyleneoxy groups or polypropyleneoxy groups, typically with from 2 to about 22 repeat alkyleneoxy units, and preferably with from 2 to about 10 repeat alkyleneoxy units, although the number of repeat alkyleneoxy units can be outside of these ranges, wherein the substituents on the substituted alkyl, alkylene, aryl, arylene, arylalkyl, arylalkylene, alkylaryl, alkylarylene, alkoxy, alkyleneoxy, and polyalkyleneoxy groups can be (but are not limited to) halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, mixtures thereof, and the like, as well as mixtures thereof, and wherein two or more substituents can be joined together to form a ring.

The 2-(3-(2H-benzotriazol-2-yl)-4-hydroxyphenyl) quaternary compounds can be prepared by any desired or suitable method. For example, N-2-(3-(benzotriazole-2-yl)-4-hydroxyphenyl propionyl amino) ethyl-N,N,N-trimethyl ammonium chloride can be made by the synthetic process outlined below:

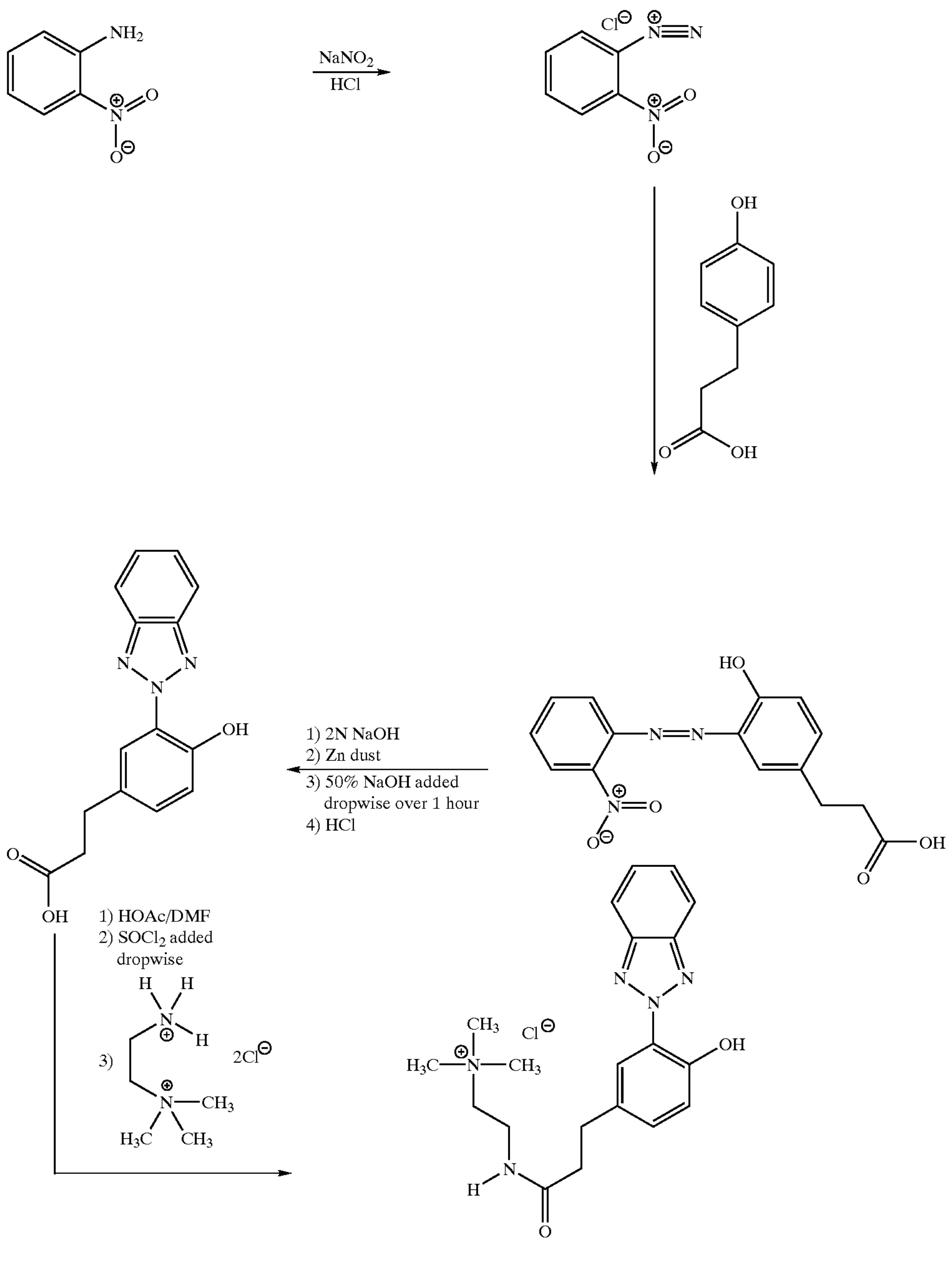

2-Nitroaniline is reacted with sodium nitrite in hydrochloric acid to yield the diazonium salt. The diazonium salt is reacted stoichiometrically with 2-(4-hydroxyphenyl) propionic acid to yield the corresponding azo compound. Dissolution in 2N NaOH and addition of Zn dust, followed by dropwise addition of 50 percent NaOH over a period of about one hour to a reaction mixture held at 45° C. yields the desired 2-hydroxyphenybenzotriazole. 2-(3-(2H-benzotriazol-2-yl)-4-hydroxyphenyl)propionic acid is isolated by acidification with hydrochloric acid and isolation of the crystalline precipitated product is by filtration. 2-(3-(2H-benzotriazol-2-yl)-4-hydroxyphenyl)propionyl aminoethyl-trimethylammonium chloride is obtained by stoichiometric reaction of a solution of 2-(3-(2H-benzotriazol-2-yl)-4-hydroxyphenyl)propionic acid in a mixture of acetic acid and dimethylformamide, with thionyl chloride, added dropwise, to generate 2-(3-(2H-benzotriazol-2-yl)-4-hydroxyphenyl)propionyl chloride. The acid chloride is reacted in situ with 2-aminoethyl(trimethylammonium chloride hydrochloride to yield 2-(3-(2H-benzotriazol-2-yl)-4-hydroxyphenyl)propionyl aminoethyl-trimethylammonium chloride, which is isolated by dilution with water and filtration. In all of the reactions in this sequence the reaction mixture is cooled in a water bath to hold the reaction temperature at about 25° C.

The quaternary dimethylaminobenzoic acid derivative

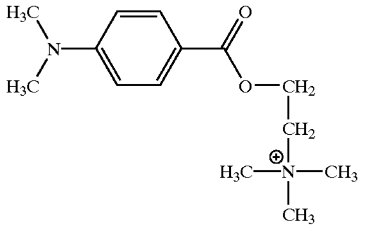

can be synthesized by the reaction of dimethylaminobenzoic acid with choline chloride in the presence of thionyl chloride.

The hydrophilic moiety can be a separate substituent, as in Formulae I, II, and III, or integral to (having) an anionic substituent the counterion of which is a cationic lightfastness moiety, as in Formula IV, or integral to (having) a cationic substituent the counterion of which is an anionic lightfastness moiety, as in Formula V. Examples of suitable hydrophilic moieties include polyoxyalkylene chains, such as polyethylene oxide, polypropylene oxide, polybutylene oxide, random or block copolymers of two or more oxyalkylene monomers, or the like, such as those of the general formulae $$—(C_xH_{2x}O)_nH$$

and $$—(OC_xH_{2x})_nOH$$

wherein x, independently in each single repeat alkylene oxide unit, is an integer of 2, 3, or 4 and n is an integer representing the number of repeat alkylene oxide units, and is typically from 1 to about 60, preferably from 1 to about 30, and more preferably from 1 to about 10, although the value of n can be outside of these ranges, poly(2-alkyloxazoline)s, such as those of the general formula

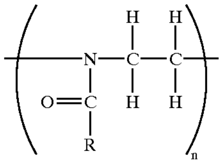

wherein R is an alkyl group, including linear, branched, cyclic, and unsaturated alkyl groups, typically with from 1 to about 22 carbons and preferably with from 1 to about 6 carbon atoms, although the number of carbon atoms can be outside of these ranges, an aryl group, typically with from 6 to about 12 carbon atoms, with 6 carbon atoms being preferred, although the number of carbon atoms can be outside of this range, an arylalkyl group, typically with from 7 to about 28 carbon atoms, and preferably with from 7 to about 10 carbon atoms, although the number of carbon atoms can be outside of these ranges, or an alkylaryl group, typically with from 7 to about 28 carbon atoms, and preferably with from 7 to about 10 carbon atoms, although the number of carbon atoms can be outside of these ranges, and n is an integer representing the number of repeat monomer units, and is typically from 1 to about 100, preferably from 1 to about 50, and more preferably from 1 to about 30, although the value of n can be outside of these ranges, poly(ethyleneimine) chains, including those of the general formula

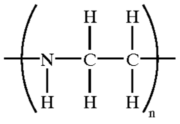

wherein n is an integer representing the number of repeat monomer units, and is typically from 1 to about 100, preferably from 1 to about 50, and more preferably from 1 to about 30, although the value of n can be outside of these ranges, or the like.

Commercially available materials include those of the general formula

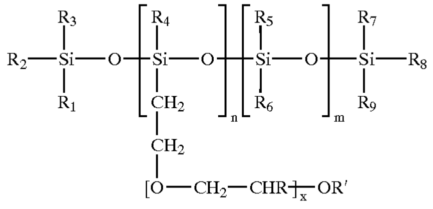

wherein R and R' each, independently of the other, is hydrogen or methyl, and $R_1$, $R_2$, $R_3$, $R_4$, $R_5$, $R_6$, $R_7$, $R_8$, and $R_9$ each, independently of the others, is an alkyl group, including linear, branched, cyclic, and unsaturated alkyl groups, typically with from 1 to about 22 carbons and preferably with from 1 to about 5 carbon atoms, although the number of carbon atoms can be outside of these ranges, an aryl group, typically with from 6 to about 12 carbon atoms, with 6 carbon atoms being preferred, although the number of carbon atoms can be outside of this range, or an arylalkyl group (with either the alkyl or the aryl portion of the group being attached to the silicon atom), typically with from 7 to about 28 carbon atoms, and preferably with from 7 to about 10 carbon atoms, although the number of carbon atoms can be outside of these ranges, and wherein the alkyl, aryl, or arylalkyl groups can, if desired, be substituted with substituents that do not significantly impair the ability of the polymer to form a uniform monolayer on a paper surface, such as cyanopropyl groups, halide groups, or the like, although substituents are not preferred, and m, n, and x are each integers representing the number of repeat monomer units, x typically being an integer of from about 6 to about 30, and preferably from about 9 to about 20, although the value can be outside of these ranges. The relative molar ratio of n and m typically falls within the range of from about 3:97 to about 60:40, although the relative ratio can be outside of this range. Molecular weights of preferred materials typically are from about 600 to about 30,000 grams per mole, although the molecular weight can be outside of this range. Commercially available examples of this class of materials are the TEGOPREN®s, available from Goldschmidt Chemical, Hopewell, Va., such as TEGOPREN® 5842, wherein x is 16 and the mole ratio of n to m is about 22:78; the DBE series of hydrophilic silicones available form Gelest, Inc., Tullytown, Pa.; the SILWET® silicone surfactant series available from Witco Corporation, OrganoSilicones Group, Greenwich, Conn.; Silicone Polyol copolymers available from Genesee Polymers Corporation, Flint, Mich.; and the like. Siloxane-oxyethylene block and graft copolymers typically are prepared by hydrosilylation of monoallyl or monovinyl ethers of polyethylene oxide glycols under the catalytic action of chloroplatinic acid by (Si—H) groups in dimethylsiloxane/methylhydrosiloxane copolymers, as disclosed in, for example, U.S. Pat. No. 2,486,458, the disclosure of which is totally incorporated herein by reference. The controlled synthesis of AB, ABA, and $(AB)_n$ type polyethylene oxide (A) and polydialkylsiloxane (B) copolymers by hydrosilylation of mono- or diallyl-terminated polyethylene oxide oligomers and telechelic (Si—H) terminated polydialkylsiloxane oligomers is also disclosed by, for example, Haesslin, *Makromol. Chem.*, 186, p. 357 (1985), the disclosure of which is totally incorporated herein by reference. Further information regarding the synthesis of such block and graft copolymers is also disclosed in, for example, U.S. Pat. No. 2,846,548; British Patent 983,850; British Patent 955,916; B. Kanner, B. Prokai, C. S. Eschbach, and G. J. Murphy, *J. Cellular Plast.*, Nov./Dec. 315 (1979); H. W. Haesslin, H. F. Eicke and G. Riess, *Makromol. Chem.*, 185, 2625 (1984): M. Galin, A. Mathis, Macromolecules, 14, 677 (1981); and Ì. Yilgör and J. E. McGrath, "Polysiloxane-Containing Copolymers: A survey of Recent Developments," *Advances in Polymer Science*, Volume 86, pp. 1–86 (Springer-Verlag 1988), the disclosures of each of which are totally incorporated herein by reference.

Commercially available materials also include those of the general formula

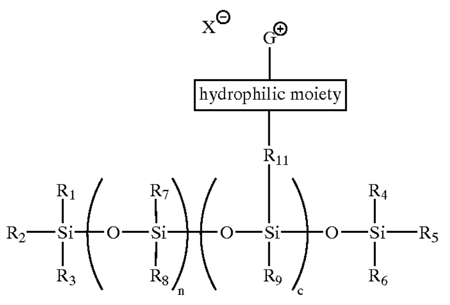

wherein $R_1$, $R_2$, $R_3$, $R_4$, $R_5$, $R_6$, $R_7$, $R_8$, and $R_9$each, independently of the others, is an alkyl group, including linear, branched, cyclic, and unsaturated alkyl groups, typically with from 1 to about 22 carbons and preferably with from 1 to about 5 carbon atoms, although the number of carbon atoms can be outside of these ranges, an aryl group, typically with from 6 to about 12 carbon atoms, with 6 carbon atoms being preferred, although the number of carbon atoms can be outside of this range, or an arylalkyl group (with either the alkyl or the aryl portion of the group being attached to the silicon atom), typically with from 7 to about 28 carbon atoms, and preferably with from 7 to about 10 carbon atoms, although the number of carbon atoms can be outside of these ranges, and wherein the alkyl, aryl, or arylalkyl groups can, if desired, be substituted with substituents that do not significantly impair the ability of the polymer to form a uniform monolayer on a paper surface, such as cyanopropyl groups, halide groups, or the like, although substituents are not preferred, $R_{11}$ is a spacer group which is either an alkylene group, typically with from 2 to about 12 carbon atoms, and preferably with from 2 to about 6 carbon atoms, or an we arylalkylene group wherein the alkyl portion is attached to the silicon atom and the aryl portion is attached to the G group, with the alkyl portion of the arylalkylene group typically having from 2 to about 12 carbon atoms, and preferably having from 2 to about 6 carbon atoms, and with the aryl portion of the arylalkylene group typically having 6 carbon atoms, n and c are each integers representing the number of repeat monomer units, G is a cationic functional group capable of binding anionic lightfastness agents as defined hereinabove, and X is an anion, including (but not limited to) halides, such as chloride, bromide, and iodide, nitrate, sulfate, sulfite, or the like. In a preferred embodiment, the R groups are all methyl groups. These polymers can be block copolymers, random copolymers, or alternating copolymers. Typically, the "n" monomers are present in the polymer in an amount of from 0 to about 99 mole percent, and preferably from about 50 to about 95 mole percent, and the "c" monomers are typically present in the polymer in an amount of from about 1 to 100 mole percent, and preferably from about 5 to about 50 mole percent, although the relative ratio of monomers can be outside of these ranges. The number average molecular weight of these polymers typically is from about 500 to about 30,000, and preferably from about 1,000 to about 5,000, although the value can be outside of these ranges. One specific example of a member of this class of organopolysiloxane copolymers is that of quaternary amino functionalized siloxane polymers, including those of the general formula

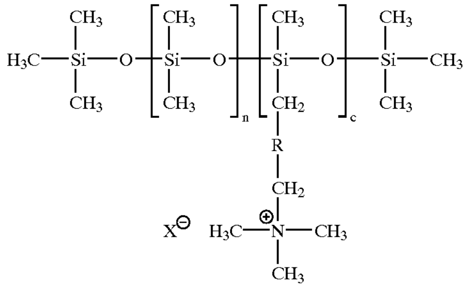

wherein n and c are each integers representing the number of repeat monomer units, X is an anion, and R is a methylene group or a benzyl group. A commercially available example of this class of materials is QMS-435, a hydrophilic silicone supplied by Gelest, Inc., Tullytown, Pa.

Polysiloxanes of the present invention can be prepared by any desired or effective method. For example, a commercially available polymer or oligomer of the general formula

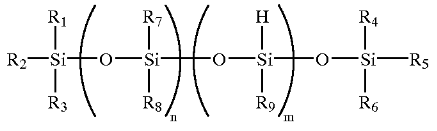

can be reacted with a lightfastness compound having a terminal >C═C< group and an alkoxy or polyalkyleneoxy compound having a terminal >C═C< group in the presence of a platinum catalyst. Siloxane-oxyethylene block and graft copolymers typically are prepared by hydrosilylation of monoallyl or monovinyl ethers of polyethylene oxide glycols under the catalytic action of chloroplatinic acid by (Si—H) groups in dimethylsiloxane/methylhydrosiloxane copolymers, as disclosed in, for example, U.S. Pat. No. 2,486,458, the disclosure of which is totally incorporated herein by reference. The controlled synthesis of AB, ABA, and $(AB)_n$ type polyethylene oxide (A) and polydialkylsiloxane (B) copolymers by hydrosilylation of mono- or diallyl-terminated polyethylene oxide oligomers and telechelic (Si—H) terminated polydialkylsiloxane oligomers is also disclosed by, for example, Haessilin, *Makromol. Chem.*, 186, p. 357 (1985), the disclosure of which is totally incorporated herein by reference. Further information regarding the synthesis of such block and graft copolymers is also disclosed in, for example, U.S. Pat. No. 2,846,548; British Patent 983,850; British Patent 955,916; B. Kanner, B. Prokai, C. S. Eschbach, and G. J. Murphy, J. *Cellular Plast.*, November/December 315 (1979); H. W. Haesslin, H. F. Eicke and G. Riess, *Makromol. Chem.*, 185, 2625 (1984); M. Galin, A. Mathis, *Macromolecules*, 14, 677 (1981); and 1. Yilgor and J. E. McGrath, "Polysiloxane-Containing Copolymers: A survey of Recent Developments," *Advances in Polymer Science*, Volume 86, pp. 1–86 (Springer-Verlag 1988), the disclosures of each of which are totally incorporated herein by reference. Siloxane-oxyethylene block and graft copolymers with covalently bound lightfastness substituents can be prepared by hydrosilylation of vinyl or allyl derivatives of lightfastness moieties prior to or simultaneously with the hydrosilylation of monoallyl or monovinyl ethers of polyethylene oxide glycols under the catalytic action of chloroplatinic acid by (Si—H) groups in dimethylsiloxane/methylhydrosiloxane copolymers.

An illustrative example of such a reaction is as follows:

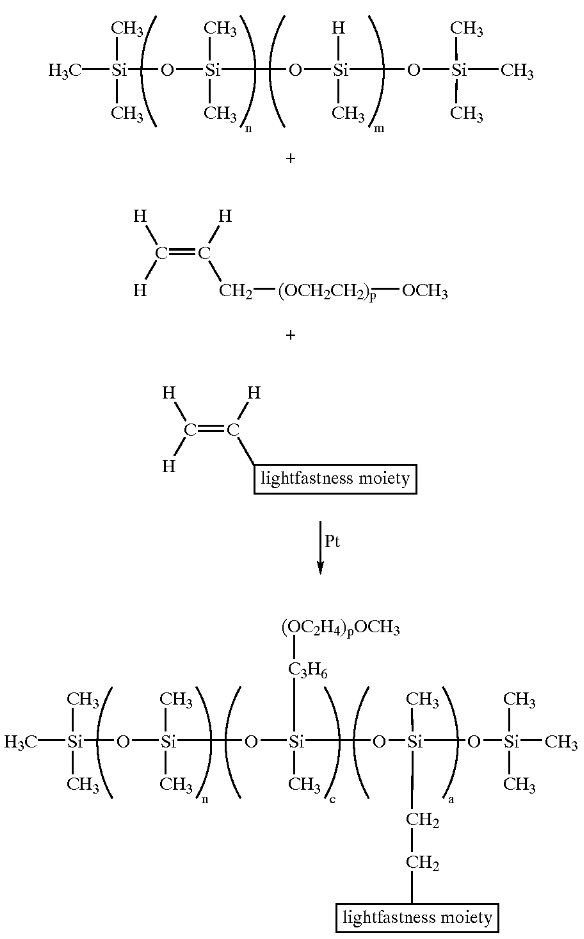

wherein m=a+c and

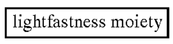

is, for example,

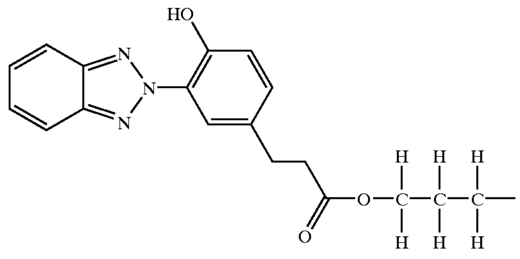

or

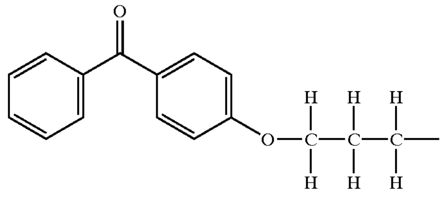

4-alloxy-2-hydroxy benzophenone is commercially available (Aldrich 41,583-9) as are 2-(3-2H-benzotriazol-2-yl)-4-hydroxyphenyl)ethyl methacrylate (Aldrich 41,343-7) eugenol (Aldrich E5,179-1), 4-allyl-1,2-dimethoxybenzene (Aldrich 28,442-4), and 4-allyl-2,6-dimethoxyphenol (Aldrich A3160-1). 2-(3-2H-benzotriazol-2-yl)-4-hydroxyphenyl)ethylpentenoate can be synthesized by esterification of 2-(3-2H-benzotriazol-2-yl)-4-hydroxyphenethyl alcohol (Aldrich 43,071-4) with pentenoic acid (Aldrich 24,592-5) or pentenoic anhydride (Aldrich 47,180-1).

In addition, a commercially available polymer or oligomer of the general formula

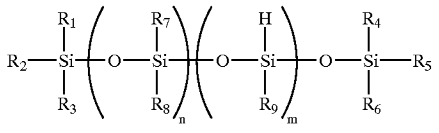

can be reacted with an anionic compound having a terminal >C═C< group and an alkoxy or polyalkyleneoxy compound having a terminal >C═C< group in the presence of a platinum catalyst. An illustrative example of such a reaction is as follows:

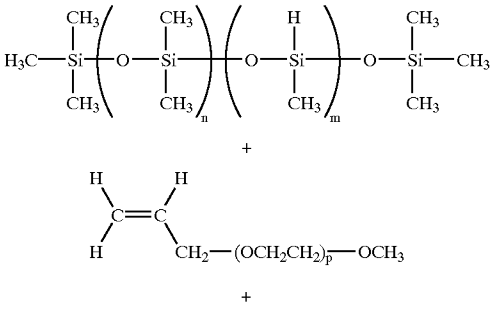

-continued

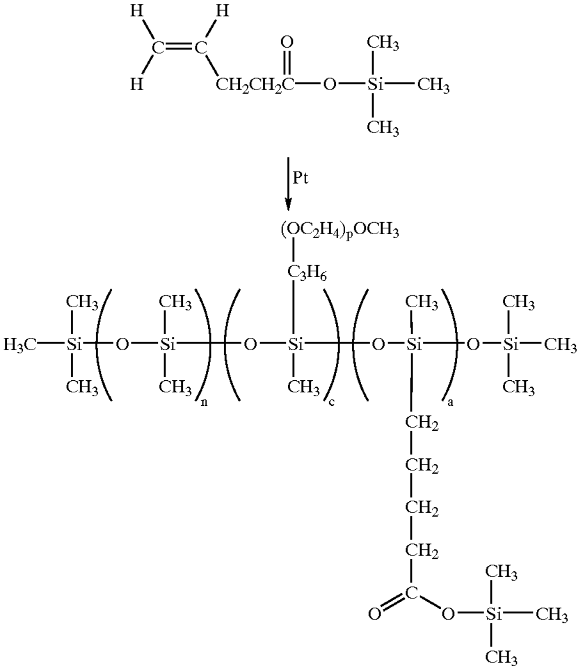

wherein m=a+c and

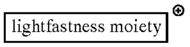

is, for example,

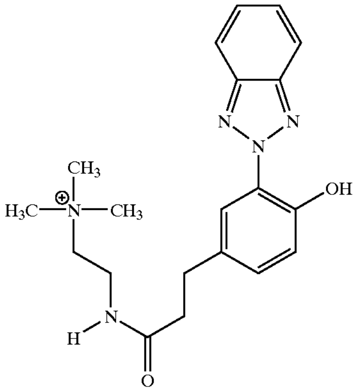

or

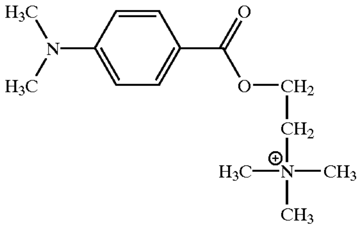

In aqueous solutions with a pH greater than about 5, the trimethylsilyl ester group is ionized to carboxylate, —$COO^-$. Introduction of a lightfastness moiety bearing a cationic substituent results in ion exchange to associate the lightfastness moiety with a anionic group covalently attached to the backbone of the hydrophilic siloxane, illustrated as follows:

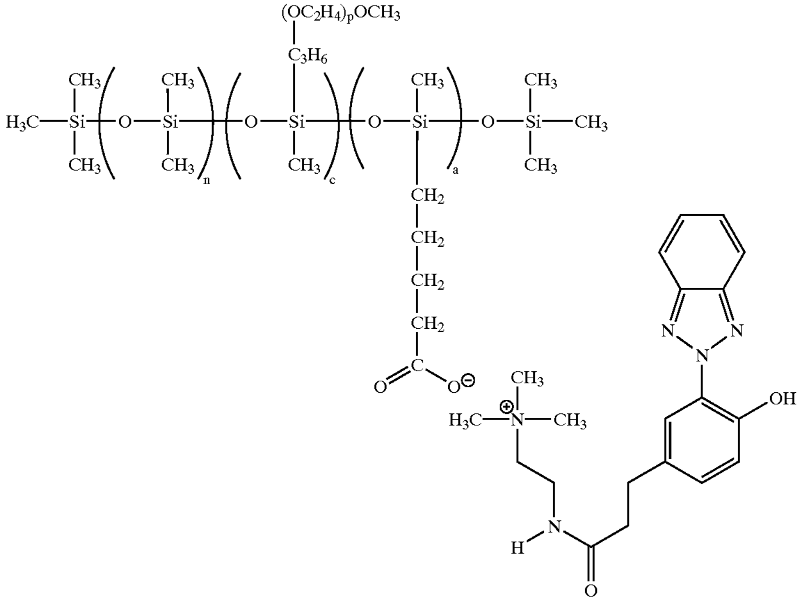

The quaternary ammonium substituted hydroxyphenyl benzotriazole illustrated above can be synthesized by the synthetic process outlined below:

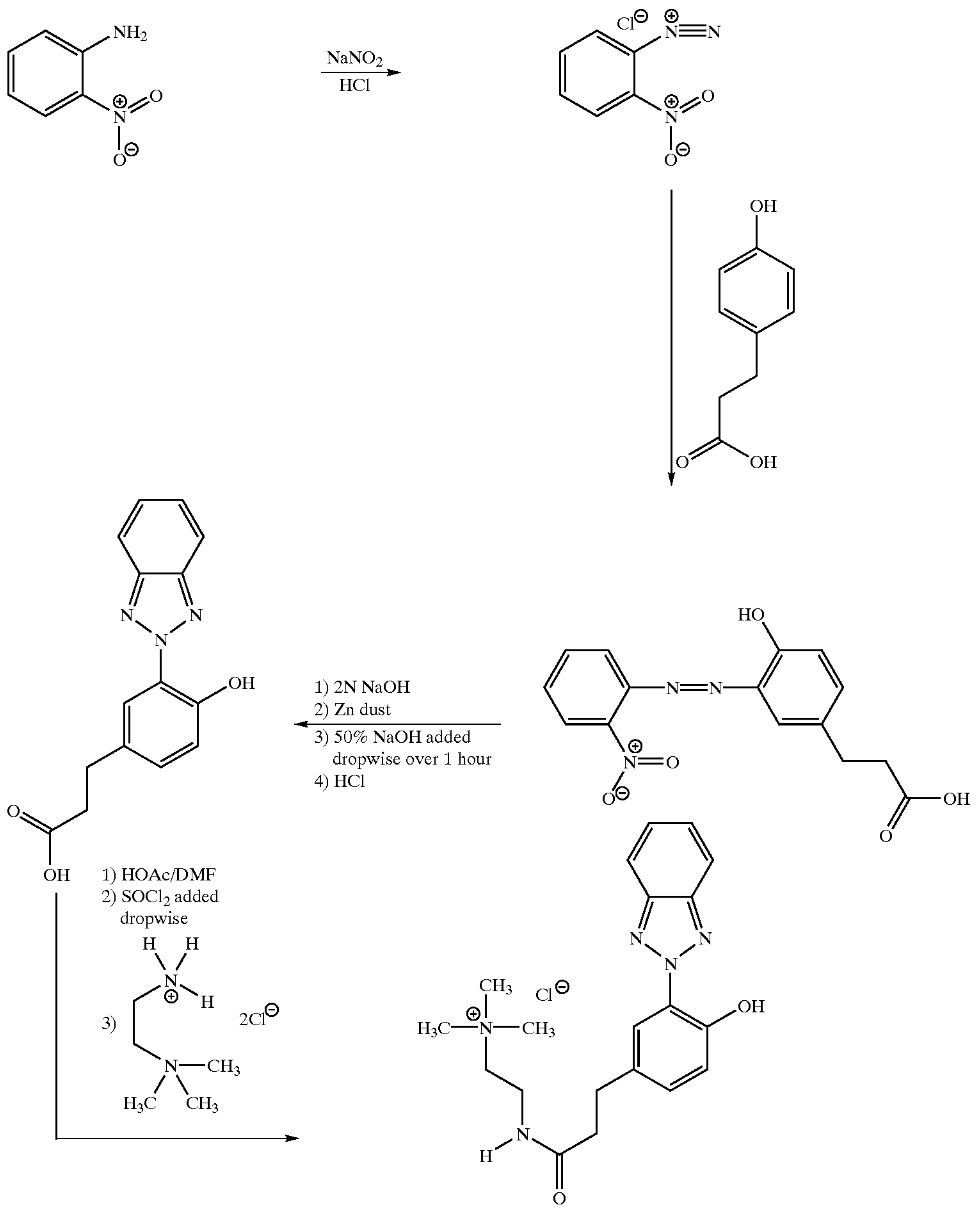

2-Nitroaniline is reacted with sodium nitrite in hydrochloric acid to yield the diazonium salt. The diazonium salt is reacted stoichiometrically with 2-(4-hydroxyphenyl) propionic acid to yield the corresponding azo 5 compound. Dissolution in 2N NaOH and addition of Zn dust, followed by dropwise addition of 50 percent NaOH over a period of about one hour to a reaction mixture held at 45° C. yields the desired 2-hydroxyphenybenzotriazole. 2-(3-(2H-benzotriazol-2-yl)-4-hydroxyphenyl)propionic acid is isolated by acidification with hydrochloric acid and isolation of the crystalline precipitated product is by filtration. 2-(3-(2H-benzotriazol-2-yl)-4-hydroxyphenyl)propionyl aminoethyl-trimethylammonium chloride is obtained by stoichiometric reaction of a solution of 2-(3-(2H-benzotriazol-2-yl)-4-hydroxyphenyl)propionic acid in a mixture of acetic acid and dimethylformamide, with thionyl chloride, added dropwise, to generate 2-(3-(2H-benzotriazol-2-yl)-4-hydroxyphenyl)propionyl chloride. The acid chloride is reacted in situ with 2-aminoethyl(trimethylammonium chloride hydrochloride to yield 2-(3-(2H-benzotriazol-2-yl)-4-hydroxyphenyl)propionyl aminoethyl-trimethylammonium chloride, which is isolated by dilution with water and filtration. In all of the reactions in this sequence the retain mixture is cooled in a water bath to hold the reaction temperature at about 25° C.

The quaternary dimethylaminobenzoic acid derivative

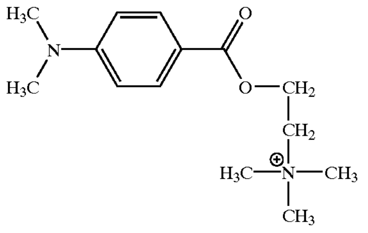

can be synthesized by the reaction of dimethylaminobenzoic acid with choline chloride in the presence of thionyl chloride.

Further, commercially available cationic substituted polysiloxane oligomers or polymers can be subjected to an ionic exchange process to associate the cationic groups thereon with a lightfastness compound substituted with an anionic moiety. The ion exchange can be performed by simple mixing of a solution containing the anionic lightfastness agent in a solvent such as acetone with a solution containing the cationic polysiloxane in a solvent such as acetone. An illustrative example of such a reaction is as follows:

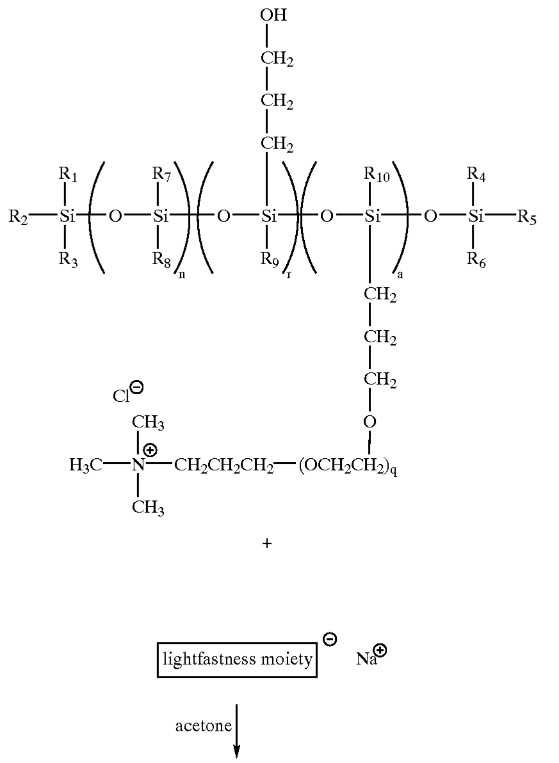

-continued

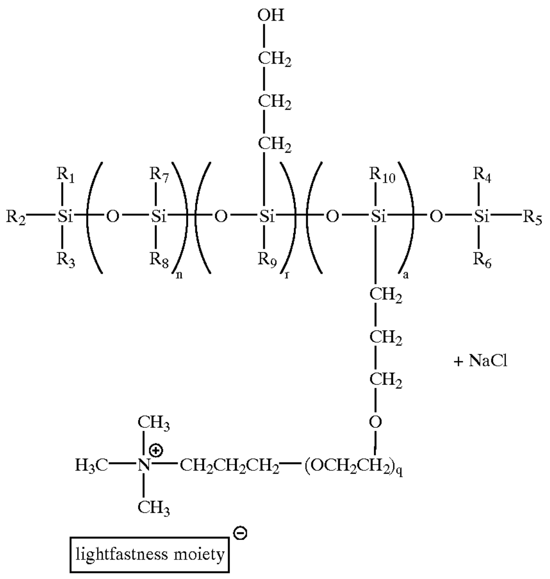

wherein r is an integer representing the number of repeat $—OSi(R_9)(C_3H_5OH)—$ monomer units, typically from about 3 to about 30, and preferably from about 3 to about 10 although the value of r can be outside of these ranges, q is an integer representing the number of repeat $—OCH_2CH_2—$ monomer units, typically from about 6 to about 30, and preferably from about 6 to about 10, although the value of q can be outside of these ranges, and

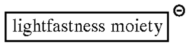

is, for example,

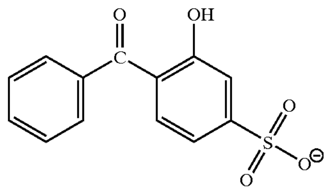

Sulfonate substituted lightfastness moieties can be obtained from a variety of commercial sources, such as Chem Service Inc., Westchester, Pa., and Lancaster Synthesis Inc., Windham, N.J. Polymeric and oligomeric siloxanes having quaternary ammonium substituents thereon are commercially available as, for example, TEGOPRENE 6922 and TEGOPREN® 6920, obtainable from Goldschmidt Chemical, Hopewell, Va., QMS435, available from Gelest, Inc., Tullytown, Pa., and poly(dimethylsiloxane-co-methyl (3-hydroxypropyl)siloxane-graft-poly(ethylene glycol)(3-(trimethylammonio)propyl chloride)ether), available from Aldrich Chemical Co., Milwaukee, Wis.

A similar process can be carried out with cationic-substituted polysiloxanes and lightfastness agents having carboxylic acid functional groups thereon, such as hydroxybenzoic acids and alkoxybenzoic acids. These carboxylic acids can be obtained from a number of commercial sources. Specifically, salicylic acid, 3-hydroxybenzoic acid, 2,3-dimethoxybenzoic acid, 2,4-dimethoxybenzoic acid, 2,5-dimethoxybenzoic acid, 2,6-dimethoxybenzoic acid, 3,4-dimethoxybenzoic acid, and 3,5-dimethoxybenzoic acid are available from Aldrich Chemical Co., Milwaukee, Wis. 3-(2H-Benzotriazol-2yl)-4-hydroxyphenylpropionic acid can be synthesized as follows:

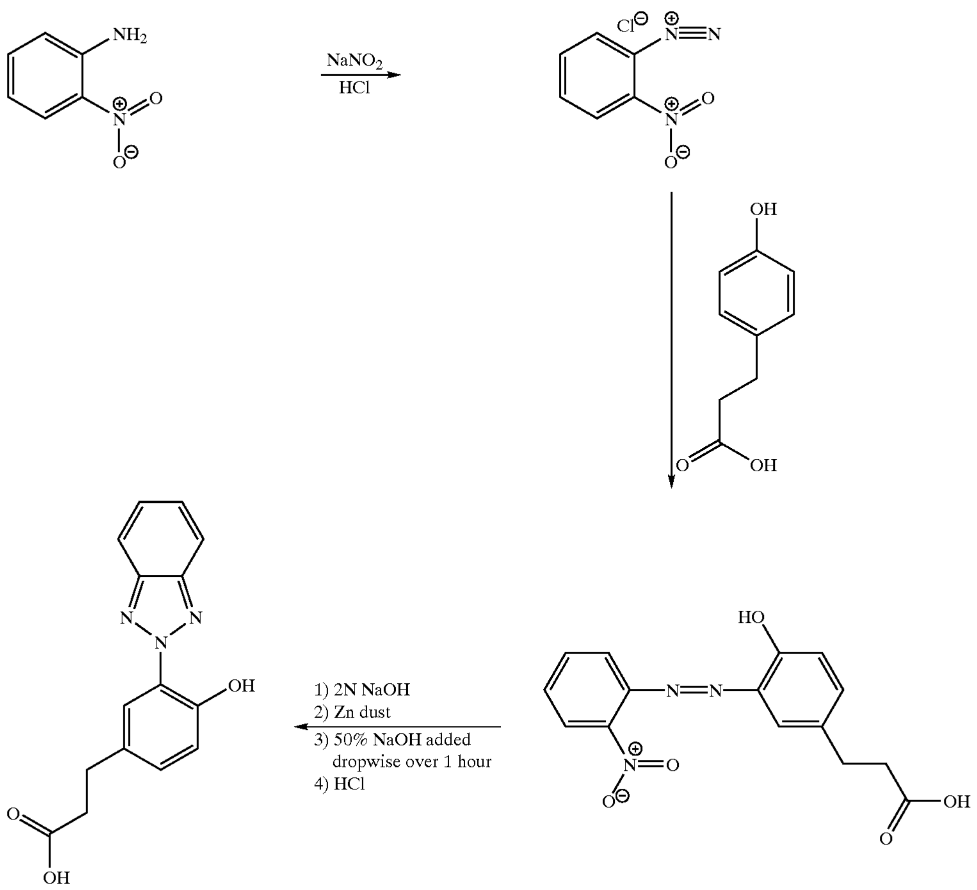

The present invention is directed to a recording sheet which comprises a substrate and an image-receiving coating situated on at least one surface of the substrate, said image-receiving coating being suitable for receiving images of an aqueous ink, said image-receiving coating comprising a compound according to the present invention.

The substrate can be either transparent or opaque. Any suitable transparent substrate can be employed. Examples include transparent materials, such as polyester, including MYLAR®, available from E. I. Du Pont de Nemours & Company, MELINEX®, available from Imperial Chemicals, Inc., CELANAR®, available from Celanese Corporation, polyethylene naphthalates, such as Kaladex PEN Films, available from Imperial Chemicals, Inc., polycarbonates such as LEXAN®, available from General Electric Company, polysulfones, such as those available from Union Carbide Corporation, polyether sulfones, such as those prepared from 4,4'-diphenyl ether, such as UDEL™, available from Union Carbide Corporation, those prepared from disulfonyl chloride, such as VICTREX®, available from ICI America Incorporated, those prepared from biphenylene, such as ASTREL™, available from 3M Company, poly (arylene sulfones), such as those prepared from crosslinked poly(arylene ether ketone sulfones), cellulose triacetate, polyvinylchloride cellophane, polyvinyl fluoride, polyimides, and the like, with polyester such as MYLAR® being preferred in view of its availability and relatively low cost.

The substrate can also be opaque, including opaque plastics, such as TESLIN®, available from PPG Industries, and filled polymers, such as MELINEX®, available from ICI. Filled plastics can also be employed as the substrate, particularly when it is desired to make a "never-tear paper" recording sheet. Paper is also suitable, including plain papers such as XEROX® 4024, diazo papers, or the like, and coated or glossy papers for special applications, such as photo quality printing.

In one embodiment of the present invention, the substrate comprises sized blends of hardwood kraft and softwood kraft fibers containing from about 10 to 90 percent by weight soft wood and from about 10 to about 90 percent by weight hardwood. Examples of hardwood include Seagull W dry bleached hardwood kraft, present in one embodiment in an amount of about 70 percent by weight. Examples of softwood include La Tuque dry bleached softwood kraft, present in one embodiment in an amount of about 30 percent by weight. These substrates can also contain fillers and pigments in any effective amounts, typically from about 1 to about 60 percent by weight, such as clay (available from Georgia Kaolin Company, Astro-fil 90 clay, Engelhard Ansilex clay), titanium dioxide (available from Tioxide Company—Anatase grade AHR), calcium silicate CH-427-97-8, XP-974 (J. M. Huber Corporation), and the like. The sized substrates can also contain sizing chemicals in any effective amount, typically from about 0.25 percent to about 25 percent by weight of pulp, such as acidic sizing, including Mon size (available from Monsanto Company), alkaline sizing such as Hercon-76 (available from Hercules Company), Alum (available from Allied Chemicals as Iron free alum), retention aid (available from Allied Colloids as Percol 292), and the like. The preferred internal sizing degree of papers selected for the present invention, including commercially available papers, varies from about 0.4 to about 5,000 seconds, and papers in the sizing range of from about 0.4 to about 300 seconds are more preferred, primarily to decrease costs. Preferably, the selected substrate is porous, and the porosity value of the selected substrate preferably varies from about 100 to about 1,260 milliliters per minute and preferably from about 50 to about 600 milliliters per minute to enhance the effectiveness of the recording sheet in ink jet processes. Preferred basis weights for the substrate are from about 40 to about 400 grams per square meter, although the basis weight can be outside of this range.

Illustrative examples of commercially available internally and externally (surface) sized substrates suitable for the present invention include Diazo papers, offset papers, such as Great Lakes offset, recycled papers, such as Conservatree, office papers, such as Automimeo, Eddy liquid toner paper and copy papers available from companies such as Nekoosa, Champion, Wiggins Teape, Kymmene, Modo, Domtar, Veitsiluoto and Sanyo, and the like, with XEROX® 4024™ papers and sized calcium silicate-clay filled papers being particularly preferred in view of their availability, reliability, and low print through. Pigmented filled plastics, such as Teslin (available from PPG industries), are also preferred as supporting substrates.

The substrate can be of any effective thickness. Typical thicknesses for the substrate are from about 50 to about 500 microns, and preferably from about 100 to about 125 microns, although the thickness can be outside these ranges.

The image receiving coating can consist solely of the compound according to the present invention. Optionally, the image receiving coating can also contain a binder. When the image receiving coating comprises materials in addition to the compound of the present invention, the compound of the present invention is present in the image receiving coating in any desired or effective amount, typically at least about 1 percent by weight of the coating, preferably at least about 2 percent by weight of the coating, and more preferably at least about 5 percent by weight of the coating, and typically no more than about 50 percent by weight of the coating, preferably no more than about 20 percent by weight of the coating, and more preferably no more than about 10 percent by weight of the coating, although the amount can be outside of these ranges.

Examples of suitable binders include hydrophilic polysaccharides and their modifications, such as (1) starch (such as starch SLS-280, available from St. Lawrence starch), (2) cationic starch (such as Cato-72, available from National Starch), (3) hydroxyalkylstarch, wherein alkyl has at least one carbon atom and wherein the number of carbon atoms is such that the material is water soluble, preferably from about 1 to about 20 carbon atoms, and more preferably from about 1 to about 10 carbon atoms, such as methyl, ethyl, propyl, butyl, or the like (such as hydroxypropyl starch (#02382, available from Poly Sciences Inc.) and hydroxyethyl starch (#06733, available from Poly Sciences Inc.)), (4) gelatin (such as Calfskin gelatin #00639, available from Poly Sciences Inc.), (5) alkyl celluloses and aryl celluloses, wherein alkyl has at least one carbon atom and wherein the number of carbon atoms is such that the material is water soluble, preferably from 1 to about 20 carbon atoms, more preferably from 1 to about 10 carbon atoms, and even more preferably from 1 to about 7 carbon atoms, such as methyl, ethyl, propyl, butyl, pentyl, hexyl, benzyl, and the like (such as methyl cellulose (Methocel AM 4, available from Dow Chemical Company), benzyl cellulose, and the like), and wherein aryl has at least 6 carbon atoms and wherein the number of carbon atoms is such that the material is water soluble, preferably from 6 to about 20 carbon atoms, more preferably from 6 to about 10 carbon atoms, and even more preferably about 6 carbon atoms, such as phenyl cellulose, (6) hydroxy alkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as hydroxyethyl cellulose (Natrosol 250 LR, available from Hercules Chemical Company), and hydroxypropyl cellulose (Klucel Type E, available from Hercules Chemical Company)), (7) alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as ethyl hydroxyethyl cellulose (Bermocoll, available from Berol Kem. A. B. Sweden)), (8) hydroxy alkyl alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxyethyl methyl cellulose (HEM, available from British Celanese Ltd., also available as Tylose MH, MHK from Kalle A. G.), hydroxypropyl methyl cellulose (Methocel K35LV, available from Dow Chemical Company), and hydroxy butylmethyl cellulose (such as HBMC, available from Dow Chemical Company)), (9) dihydroxyalkyl cellulose, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dihydroxypropyl cellulose, which can be prepared by the reaction of 3-chloro-1,2-propane with alkali cellulose), (10) hydroxy alkyl hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxypropyl hydroxyethyl cellulose, available from Aqualon Company), (11) halodeoxycellulose, wherein halo represents a halogen atom (such as chlorodeoxycellulose, which can be prepared by the reaction of cellulose with sulfuryl chloride in pyridine at 25° C.), (12) amino deoxycellulose (which can be prepared by the reaction of chlorodeoxy cellulose with 19 percent alcoholic solution of ammonia for 6 hours at 160° C.), (13) dialkylammonium halide hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as diethylammonium chloride hydroxy ethyl cellulose, available as Celquat H-100, L-200, National Starch and Chemical Company), (14) hydroxyalkyl trialkyl ammonium halide hydroxyalkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as hydroxypropyl trimethyl ammonium chloride hydroxyethyl cellulose, available from Union Carbide Company as Polymer JR), (15) dialkyl amino alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, (such as diethyl amino ethyl cellulose, available from Poly Sciences Inc. as DEAE cellulose #05178), (16) carboxyalkyl dextrans, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, and the like, (such as carboxymethyl dextrans, available from Poly Sciences Inc. as #16058), (17) dialkyl aminoalkyl dextran, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as diethyl aminoethyl dextran, available from Poly Sciences Inc. as #5178), (18) amino dextran (available from Molecular Probes Inc.), (19) carboxy alkyl cellulose salts, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethyl cellulose CMC 7HOF, available from Hercules Chemical Company), (20) gum arabic (such as #G9752, available from Sigma Chemical Company), (21) carrageenan (such as #C1013 available from Sigma Chemical Company), (22) karaya gum (such as #G0503, available from Sigma Chemical Company), (23) xanthan (such as Keltrol-T, available from Kelco division of Merck and Company), (24) chitosan (such as #C3646, available from Sigma Chemical Company), (25) carboxyalkyl hydroxyalkyl guar, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as carboxymethyl hydroxypropyl guar, available from Auqualon Company), (26) cationic guar (such as Celanese Jaguars C-14-S, C-15, C-17, available from Celanese Chemical Company), (27) n-carboxyalkyl chitin, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, such as n-carboxymethyl chitin, (28) dialkyl ammonium hydrolyzed collagen protein, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dimethyl ammonium hydrolyzed collagen protein, available from Croda as Croquats), (29) agar-agar (such as that available from Pfaltz and Bauer Inc.), (30) cellulose sulfate salts, wherein the cation is any conventional cation, such as sodium, lithium, potassium, calcium, magnesium, or the like (such as sodium cellulose sulfate #023 available from Scientific Polymer Products), and (31) carboxyalkylhydroxyalkyl cellulose salts, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethylhydroxyethyl cellulose CMHEC 43H and 37L available from Hercules Chemical Company); and the like.

Also suitable are polymers which form latices in water and which are applied to the substrate in the form of a latex, including styrene-butadiene latexes (such as that available from Gen Corp Polymer Products, such as RES 4040 and RES 4100, available from Unocal Chemicals, and such as DL 6672A, DL6638A, and DL6663A, available from Dow Chemical Company), ethylene-vinyl acetate latexes (such as Airflex 400, available from Air Products and Chemicals Inc.), vinyl acetate-acrylic copolymer latexes (such as synthemul 97-726, available from Reichhold Chemical Inc., Resyn 25-1110 and Resyn 25-1140, available from National Starch Company, and RES 3103 available from Unocal Chemicals), quaternary acrylic copolymer latexes, including those of the formula

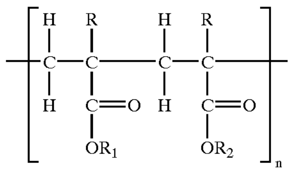

wherein n is a number of from about 10 to about 100, and preferably about 50, R is hydrogen or methyl, $R_1$ is hydrogen, an alkyl group, or an aryl group, and $R_2$ is $(N^+(CH_3)_3)_nX^{n-}$, wherein X is an anion, such as $Cl^-$, $Br^-$, $I^-$, $HSO_3^-$, $SO_3^{2-}$, $CH_2SO_3^-$, $H_2PO_4^-$, $HPO_4^{2-}$, $PO_4^{3-}$, or the like, n is an integer of from 1 to 3, and the degree of quaternization is from about 1 to about 100 percent, including polymers such as polymethyl acrylate trimethyl ammonium chloride latex, including HX42-1 and HX42-3, available from Interpolymer Corp., and the like.

Also suitable are polyethylene oxides and polyethylene oxide derivatives, such as (1) poly(oxyethylene) or poly (ethylene oxide), including POLY OX WSRN-3000 available from Union Carbide Corporation; (2) ethylene oxide/ 2-hydroxyethyl methacrylate/ethylene oxide and ethylene oxide/hydroxypropyl methacrylate/ethylene oxide triblock copolymers, which can be synthesized via free radical polymerization of hydroxyethyl methacrylate or hydroxypropyl methacrylate with 2-aminoethanethiol using α,α'-azobisisobutyronitrile as initiator, and reacting the resulting amino-semitelechelic oligo-hydroxyethyl methacrylate or amino-hydroxypropyl methacrylate with an isocyanate-polyethylene oxide complex in chlorobenzene at 0° C., and precipitating the reaction mixture in diethylether, filtering and drying in vacuum; (3) ethylene oxide/4-vinyl pyridine/ethylene oxide triblock copolymers, which can be synthesized via anionic polymerization of 4-vinyl pyridine with sodium naphthalene as initiator at −78° C. and then adding ethylene oxide monomer, the reaction being carried out in an explosion proof stainless steel reactor; (4) ionene/ethylene oxide/ionene triblock copolymers, which can be synthesized via quaternization reaction of one end of each 3—3 ionene with the halogenated, preferably brominated, poly (oxyethylene) in methanol at about 40° C.; (5) ethylene oxide/isoprene/ethylene oxide triblock copolymers, which can be synthesized via anionic polymerization of isoprene with sodium naphthalene in tetrahydrofuran as solvent at −78° C., and then adding monomer ethylene oxide and polymerizing the reaction for three days, after which time the reaction is quenched with methanol, the ethylene oxide content in the aforementioned triblock copolymers being from about 20 to about 70 percent by weight and preferably about 50 percent by weight; (6) ethylene oxide/propylene oxide copolymers, including ethylene oxide/propylene oxide/ethylene oxide triblock copolymers, such as Alkatronic EGE-31-1 available from Alkaril Chemicals, propylene oxide/ethylene oxide/propylene oxide triblock copolymers, such as Alkatronic PGP 3B-1 available from Alkaril Chemicals, tetrafunctional block copolymers derived from the sequential addition of ethylene oxide and propylene oxide to ethylene diamine, the content of ethylene oxide in these block copolymers being from about 5 to about 95 percent by weight, such as Tetronic 50R8 available from BASF Corporation; and the like.

Mixtures of any two or more of the above binders can also be employed.

The image receiving coating layer is present on the substrate of the recording sheet of the present invention in any effective thickness. Typically, the total thickness of the image receiving coating layer (on each surface, when both sides of the substrate are coated) is from about 1 to about 25 microns and preferably from about 5 to about 10 microns, although the thickness can be outside of these ranges. Typically, the image receiving coating layer (on each surface, when both sides of the substrate are coated) is present on the substrate in an amount of from about 2.5 to about 25 grams per square meter, and preferably from about 5 to about 10 grams per square meter, although the amount can be outside of these ranges.

If desired, additional layers can be present in the recording sheet, such as layers situated between the substrate and the image-receiving layer, protective overcoatings situated so that the image-receiving layer is between the substrate and the overcoating, antistatic layers, anticurl layers, or the like.

The coating or coatings can be applied to the substrate by any suitable technique. For example, the layer coatings can be applied by a number of known techniques, such as size press treatment, dip coating, reverse roll coating, extrusion coating, or the like. For example, the coating can be applied with a KRK size press (Kumagai Riki Kogyo Co., Ltd., Nerima, Tokyo, Japan) by dip coating and can be applied by solvent extrusion on a Faustel Coater. The KRK size press is a lab size press that simulates a commercial size press. This size press is normally sheet fed, whereas a commercial size press typically employs a continuous web. On the KRK size press, the substrate sheet is taped by one end to the carrier mechanism plate. The speed of the test and the roll pressures are set, and the coating solution is poured into the solution tank. A 4 liter stainless steel beaker is situated underneath for retaining the solution overflow. The coating solution is cycled once through the system (without moving the substrate sheet) to wet the surface of the rolls and then returned to the feed tank, where it is cycled a second time. While the rolls are being "wetted", the sheet is fed through the sizing rolls by pressing the carrier mechanism start button. The coated sheet is then removed from the carrier mechanism plate and is placed on a 12 inch by 40 inch sheet of 750 micron thick Teflon for support and is dried on the Dynamic Former drying drum and held under restraint to prevent shrinkage. The drying temperature is approximately 105° C. This method of coating treats both sides of the substrate simultaneously.

In dip coating, a web of the material to be coated is transported below the surface of the liquid coating composition by a single roll in such a manner that the exposed site is saturated, followed by removal of any excess coating by the squeeze rolls and drying at 100° C. in an air dryer. The liquid coating composition generally comprises the desired coating composition dissolved in a solvent such as water, methanol, or the like. The method of surface treating the substrate using a coater results in a continuous sheet of substrate with the coating material applied first to one side and then to the second side of this substrate. The substrate can also be coated by a slot extrusion process, wherein a flat die is situated with the die lips in close proximity to the web of substrate to be coated, resulting in a continuous film of the coating solution evenly distributed across one surface of the sheet, followed by drying in an air dryer at 100° C.

In addition, the coating can be applied to the substrate immediately prior to printing thereon, by any desired or effective method, such as by ink jet printing, fluid deposition apparatus such as that disclosed in U.S. Pat. No. 6,142,618, the disclosure of which is totally incorporated herein by reference, and the like. Another embodiment of the present invention is directed to a process which comprises (a) applying to a substrate a lightfastness agent of one of the formulae

I

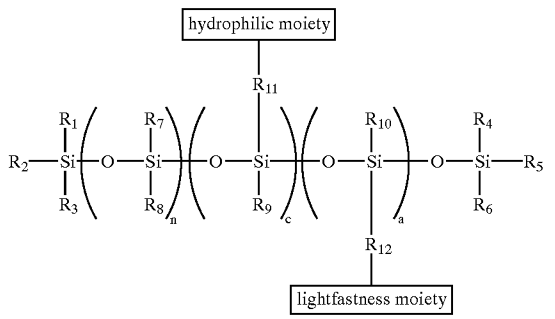

II

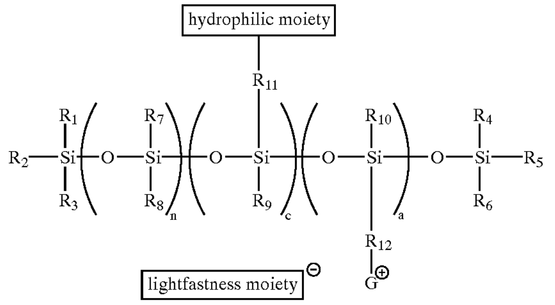

-continued

III

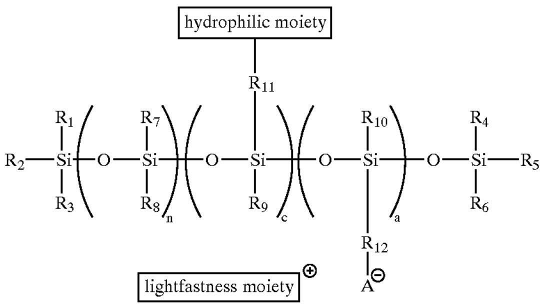

IV

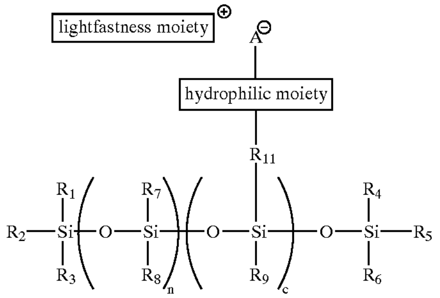

or

V

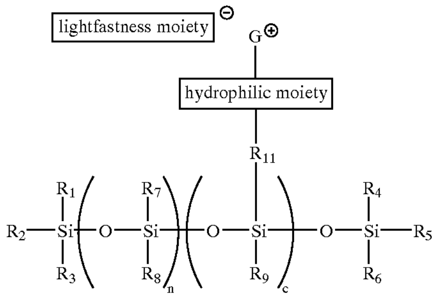

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat —OSi($R_7$)($R_8$)— monomer units, a is an integer representing the number of repeat —OSi($R_{10}$)($R_{12}$-lightfastness moiety)— monomer units, and c is an integer representing the number of repeat —OSi($R_9$)($R_{11}$-hydrophilic moiety)— monomer units; (b) subsequent to step (a), incorporating into an ink jet printing apparatus an ink composition which comprises water and a colorant; and (c) causing droplets of the ink composition to be ejected in an imagewise pattern onto the substrate. In this embodiment, the lightfastness agent is applied to the substrate in any desired or effective amount. Typically, the lightfastness agent is applied in an amount of from about 10 to about 200 microliters per 8.5 by 11 inch substrate surface coated (93.5 square inches), although the amount can be outside of these ranges. For example, on very light papers, amounts as low as 1 microliter per 8.5 by 11 inch substrate surface coated can be suitable, and on substrates such as tee shirt fabrics, amounts as high as 500 to 1,000 microliters per 8.5 by 11 inch substrate surface coated can be suitable. The lightfastness agent can be diluted prior to application if desired. If the lightfastness agent is applied to the substrate by an ink jet printing process, the lightfastness agent can be incorporated into a liquid vehicle such as those commonly employed with ink jet printing inks in any desired or effective amount, typically at least about 0.25 percent by weight of the ink, preferably at least about 0.5 percent by weight of the ink, and more preferably at least about 1 percent by weight of the ink, and typically no more than about 10 percent by weight of the ink, preferably no more than about 5 percent by weight of the ink, and more preferably no more than about 3 percent by weight of the ink, although the amount can be outside of these ranges.

Recording sheets of the present invention can be employed in ink jet printing processes. One embodiment of the present invention is directed to a process which comprises applying an aqueous recording liquid to a recording sheet of the present invention in an imagewise pattern. Another embodiment of the present invention is directed to a printing process which comprises (1) incorporating into an ink jet printing apparatus containing an aqueous ink a recording sheet of the present invention, and (2) causing droplets of the ink to be ejected in an imagewise pattern onto the recording sheet, thereby generating images on the recording sheet. In a particularly preferred embodiment, the printing apparatus employs a thermal ink jet process wherein the ink in the nozzles is selectively heated in an imagewise pattern, thereby causing droplets of the ink to be ejected in imagewise pattern, In another particularly preferred embodiment, the printing apparatus employs an acoustic ink jet process wherein droplets of the ink are caused to be ejected in imagewise pattern by acoustic beams.

The recording sheets of the present invention can also be used in any other printing or imaging process, such as printing with pen plotters, handwriting with ink pens, offset printing processes, or the like, provided that the ink employed to form the image is compatible with the ink receiving layer of the recording sheet.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Preparation of the Trimethylsilyl Ester of Propenoic Acid

The trimethylsilyl ester of propenoic acid was prepared by reaction of propenoic acid and hexamethyldisilazane. Thus, 13.3 grams (0.133 mole) of propenoic acid (obtained from Aldrich Chemical Co., Milwaukee, Wis.) was charged to a 100 milliliter round bottomed flask fitted with a condenser, argon purge, rubber serum cap, and magnetic stirring bar. After purging for about 15 minutes, 11.8 grams (0.73 mole) of hexamethyldisilazane (obtained from Aldrich Chemical Co.) was added through the serum cap via syringe. The reaction mixture exothermed, and vigorous outgassing was observed for 15 to 20 minutes. A drop of concentrated sulfuric acid was then added and the reaction mixture was refluxed for 2 hours to drive the reaction to completion. The flask was then fitted with a vacuum-jacketed Vigreux column, distillation head, and condenser with fraction cutter. The product was isolated by distillation and was used in Example II.

EXAMPLE II

Preparation of Poly(dimethylsiloxane-co-methyl (carboxypentanoyl) Siloxane)-graft-methoxypolyethylene Glycol Poly(dimethylsiloxane-co-methyl (carboxyltrimethylsilylpentanoyl)siloxane)-graft-methoxypolyethylene glycol was prepared by hydrosilylation of a mixture of the trimethylsilylester of propenoic acid (prepared in Example I) and methoxy polyethylene glycol monoallyl ether (Bimax Chemical, Cockeysville Md.) catalyzed by platinum divinyltetramethyl disiloxane complex (SIP 6831.0, obtained from Gelest, Inc., Tullytown Pa.). Thus, 19.8 grams (0.05 equivalents) of poly (dimethylsiloxane-co-methyl hydrogen siloxane) containing 15 to 18 mole percent (MeHSiO) (HMS 151, obtained from Gelest, Inc., Tullytown, Pa.), 3.5 grams (0.035 equivalents) of trimethylsilyl pentenoic acid (0.020 equivalents) of methoxy polyethylene glycol monoallyl ether, and 28 grams of methylene chloride were charged to a 50 milliliter bottle equipped with a magnetic stirring bar. The solution was purged with argon for 15 minutes prior to the introduction of 4 drops of SIP 6831.0. The reaction was allowed to proceed for 4 days at ambient temperature. At this time the reaction was judged to be complete on the basis of the disappearance of the characteristic Si—H infrared band at 2160–2180 $cm^{-1}$. Water was then added to the reaction mixture, and hydrolysis was effected by heating the mixture on a steam cone. The water and methylene chloride were then removed in vacuo. Methylene chloride was added and the resulting solution was passed through a column filled with neutral alumina to remove spent Pt catalyst. Removal of methylene chloride in vacuo yielded the desired product.

EXAMPLE III

Preparation of Poly(dimethvlsiloxane-co-methyl(3-propyl(2-hydroxybenzophenone)siloxane)-graft-methoxyplyethylene Glycol)

Poly(dimethylsiloxane-co-methyl(3-propyl(2-hydroxybenzophenone) siloxane)-graft-methoxypolyethylene glycol) was prepared by hydrosilylation of a mixture of allyloxyhydroxybenzophenone and methoxy polyethylene glycol monoallyl ether catalyzed by platinum divinyltetramethyl disiloxane complex (SIP 6831.0, obtained from Gelest, Inc., Tullytown Pa.). Thus, 19.8 grams (0.05 equivalents) of poly(dimethylsiloxane-co-methyl hydrogen siloxane) containing 15 to 18 mole percent (MeHSiO) (HMS 151, obtained from Gelest, Inc., Tullytown, Pa.), 0.035 equivalents of allyloxyhydroxybenzophenone, 0.020 equivalents of methoxy polyethylene glycol monoallyl ether, and 28 grams of methylene chloride were charged to a 50 milliliter bottle equipped with a magnetic stirring bar. The solution was purged with argon for 15 minutes prior to the introduction of 4 drops of SIP 6831.0. The reaction was allowed to proceed for 4 days at ambient temperature. At this time the reaction was judged to be complete on the basis of the disappearance of the characteristic Si—H infrared band at 2160–2180 $cm^{-1}$. Additional methylene chloride was added and the resulting solution was passed through a column filled with neutra alumina to remove spent Pt catalyst. Removal of methylene chloride in vacuo yielded the desired product.

EXAMPLE IV

Preparation of Poly(dimethylsiloxane-co-methyl(3-propyl(2-hydroxybenzotriazole)siloxane)-graft-methoxypolyethylene Glycol)

Poly(dimethylsiloxane-co-methyl(2-(3-2H-benzotriazol-2-yl)-4-hydroxyphenyl)ethylpentanoate)siloxane)-graft-methoxypolyethylene glycol) was prepared by a procedure analogous to that of Example III except that the allyloxyhydroxybenzophenone was substituted with 2-(3-2H-benzotriazol-2-yl-4-hydroxyphenyl) ethylpentenoate. 2-(3-2H-benzotriazol-2-yl-4-hydroxyphenyl) ethylpentenoate was synthesized by esterification of 2-(3-2H-benzotriazol-2-yl-4-hydroxyphenethyl alcohol (Aldrich 43,071-4) with pentenoic acid (Aldrich 24,592-5) or pentenoic anhydride (Aldrich 47,180-1).

EXAMPLE V

Preparation of Quaternary Ammonium Hydroxybenzotriazole Salt of Poly (dimethylsiloxane-co-methyl (carboxypentanoyl) siloxane)-graft-methoxypolyethylene Glycol)

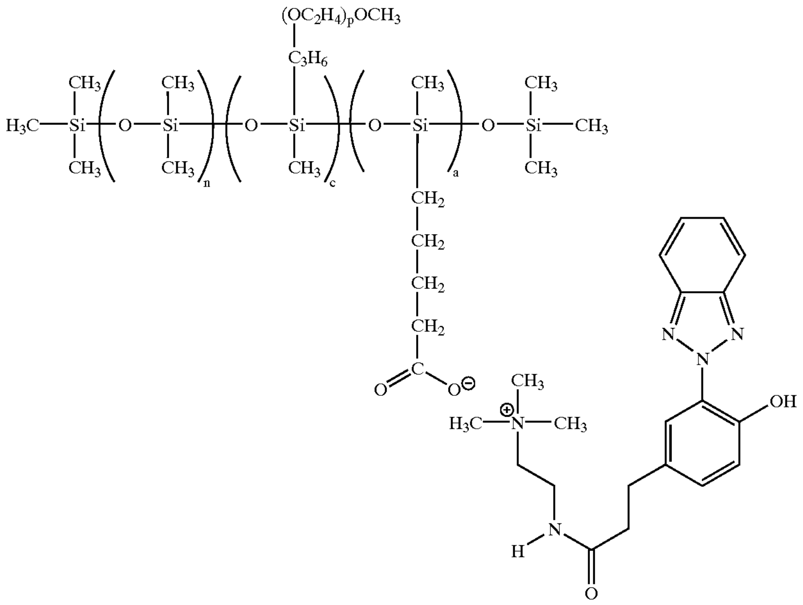

The above complex with a cationic lightfastness agent is prepared by ion exchange. Ion exchange is accomplished by mixing of an acetone solution containing the cationic lightfastness agent in acetone with an acetone solution containing the anionic hydrophilic polysiloxane prepared in Example II. NaCl is removed by filtration and the product is obtained by removal of acetone in vacuo.

EXAMPLE VI

Synthesis of the 2-Hydroxy-4-methoxybenzophenone-5-sulfonate Salt of QMS 435

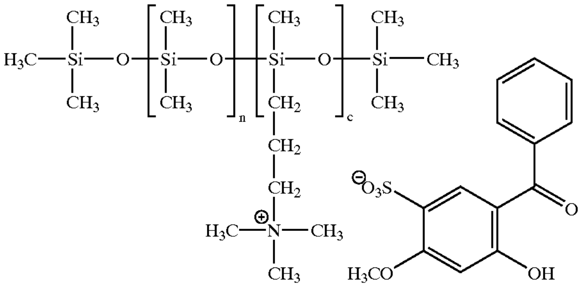

The 2-hydroxy-4-methoxybenzophenone-5-sulfonate salt of QMS 435 (poly(dimethylsiloxane-co-methyl(3-trimethylaminopropyl) siloxane)) is prepared by ion exchange. Ion exchange is accomplished by mixing of an acetone solution containing the anionic lightfastness agent sodium 2-hydroxy-4-methoxybenzophenone-5-sulfonate in acetone with an acetone solution containing the cationic polysiloxane QMS435 (available from Gelest, Inc., Tullytown, Pa). NaCl is removed by filtration and the product is obtained by removal of acetone in vacuo.

EXAMPLE VII

The lightfastness agents prepared in Examples II through VI are each diluted by 33 percent with tripropylene glycol monomethyl ether (DOWANOL TPM, obtained from Dow Chemical Co., Midland, Mich.) to yield fluids containing 67 percent by weight of the lightfastness agents. These fluids are each loaded in the sump of an apparatus analogous to that shown in FIG. 1 of U.S. Pat. No. 6,270,214, the disclosure of which is totally incorporated herein by reference, and XEROX® Image series paper is passed through the apparatus to deposit uniformly amounts of fixing fluid ranging in most instances from 10 to 200 microliters per page. Thereafter, the treated paper is printed with a XEROX® XJ4C ink jet printer. For comparison purposes the printing process is repeated with XEROX® Image series paper that has not been treated with a lightfastness agent of the present invention. Lighifastness of the resulting prints is then evaluated as follows. Differences in solid area optical density are measured with an optical densitometer (X-RITE Model 428) and are evaluated for solid area test patterns (1.25-inch solid squares). Samples for exposure are cut from the test print area, mounted, and exposed for 48 hours in an ATLAS Model 25 FR Xenon Fadeometer equipped with a 2500 watt lamp, a borosilicate glass inner filter (275 nm cutoff), and a soda lime glass outer filter (320 nm cutoff). This combination of light filters closely approximates sunlight passing through window glass. The prints are aged in the dark for 24 hours before making lightfastness measurements. Irradiance is 0.75 Watts per square meter and total irradiation is 129.6 KiloJoules per square meter. Black panel temperature is 63° C. Nominal relative humidity is 35 percent. It is believed that the prints made on the papers treated with the lightfastness agents of the present invention will exhibit superior lightfastness compared to the prints made on the papers not treated with a lightfastness agent.

The above process is repeated except that the lightfastness agents of the present invention are diluted by 20 percent with octanol to yield fluids containing 80 percent by weight of the lightfastness agents. It is believed that similar results will be observed.

The above process is repeated except that the lightfastness agents of the present invention are diluted by 60 percent with a low viscosity ethoxy-terminated siloxane oil (PS-393, obtained from Petrach Chemical) to yield fluids containing 40 percent by weight of the lightfastness agents. It is believed that similar results will be observed.

The above process is repeated except that the lightfastness agents of the present invention are diluted by 33 percent with dipropylene glycol dibenzoate to yield a fluid containing 67 percent by weight of the lightfastness agents. It is believed that similar results will be observed.

EXAMPLE VIII

The lightfastness agents prepared in Examples II through VI are each incorporated into fluids suitable for printing with an ink jet printer. These fluids are prepared by simple mixing of the following ingredients:

| Ingredient | Supplier | Amount (parts by weight) |
|---|---|---|
| sulfolane* | Phillips 66 | 15 |
| butyl carbitol | Van Waters & Rogers | 12 |
| acetylethanolamine** | Scher Chemical | 15 |
| lightfastness agent | Examples II through VI | 1 |
| deionized water | — | 25.8 |
| DOWICIL ® 150/200 biocide | Dow Chemical Co. | 0.1 |
| EDTA | Dow Chemical Co. | 0.065 |
| imidazole | BASF | 1 |
| CRISANOL ® E2000 polyethylene oxide | Clariant Chemical | 0.05 |

*95 wt. % sulfolane, 5 wt. % water
**75 wt. % acetylethanolamine, 25 wt. % water An ink jet printing composition is then prepared by simple mixing of the following ingredients:

| Ingredient | Supplier | Amount (parts by weight) |
|---|---|---|
| sulfolane* | Phillips 66 | 15 |
| butyl carbitol | Van Waters & Rogers | 12 |
| acetylethanolamine** | Scher Chemical | 15 |
| PROJET ® RED OAM dye*** | Zeneca | 5 |
| PROJET ® MAGENTA 3BOA**** | Zeneca | 25 |
| deionized water | — | 25.8 |
| DOWICIL ® 150/200 biocide | Dow Chemical Co. | 0.1 |
| EDTA | Dow Chemical Co. | 0.065 |
| imidazole | BASF | 1 |
| CRISANOL ® E2000 polyethylene oxide | Clariant Chemical | 0.05 |

*95 wt. % sulfolane, 5 wt. % water
**75 wt. % acetylethanolamine, 25 wt. % water
***containing 8.5 wt. % Acid Red 52 dye solids in water
****containing 10 wt. % dye solids in water The lightfastness fluid and the ink are then incorporated into separate cartridges in a XEROX® M-750 ink jet printer and used to print images on XEROX® Hi-Tech Ink Jet paper and FOLEX® photo paper. The process is carried out twice, once with the lightfastness fluid being printed onto the paper first, followed by printing the ink on top of the lightfastness fluid, and once with the ink being printed onto the paper first, followed by printing the lightfastness fluid on top of the ink. For comparison purposes, the ink is also printed onto the paper alone without any lightfastness fluid being applied either before or after printing. Lightfastness of the resulting prints is evaluated as described in Example VII. It is believed that the prints made on the papers treated with the lightfastness agents of the present invention will exhibit superior lightfastness compared to the prints made on the papers not treated with a lightfastness agent.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A recording sheet which comprises a substrate and an image-receiving coating situated on at least one surface of the substrate, said image-receiving coating being suitable for receiving images of an aqueous ink, said image-receiving coating comprising a lightfastness agent of one of the formulae

I

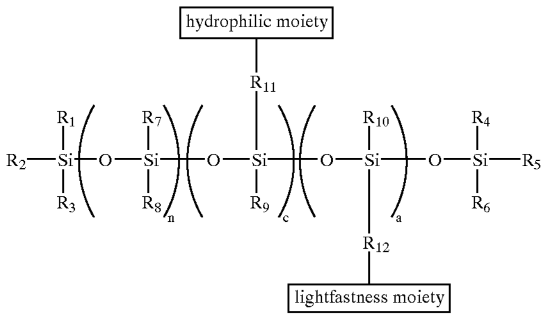

II

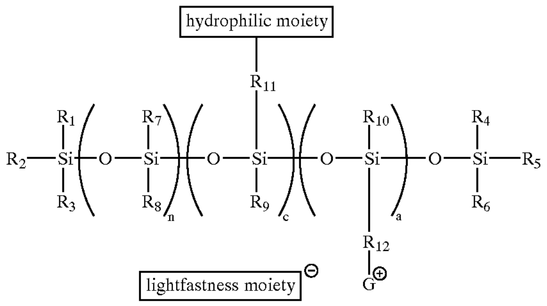

-continued

III

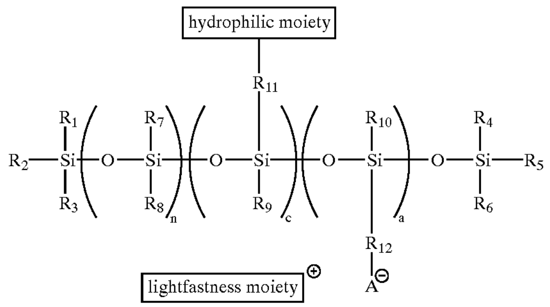

IV

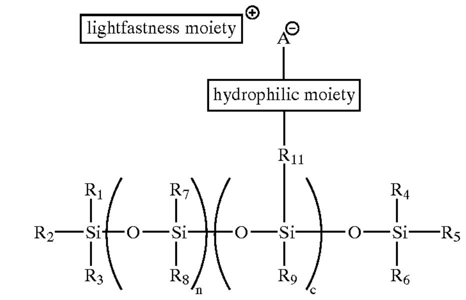

or

V

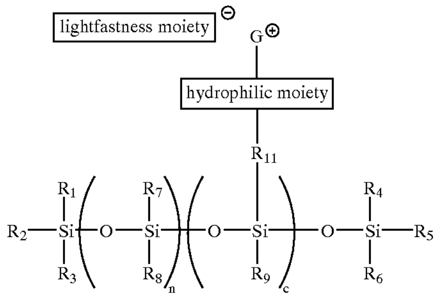

wherein $R_1$, $R_2$, $R_3$, $R_4$, $R_9$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat $—OSi(R_7)(R_8)—$ monomer units, a is an integer representing the number of repeat $—OSi(R_{10})(R_{12}$-lightfastness moiety)— monomer units, and c is an integer representing the number of repeat $—OSi(R_9)(R_{11}$-hydrophilic moiety)— monomer units.

2. A recording sheet according to claim 1 wherein the lightfastness agent is of Formula I and the lightfastness moiety is a 2-(3-(2H-benzotriazol-2-yl)-4-hydroxyphenyl) group, a hydroxybenzophenone group, a hydroxybenzoic acid group, an alkoxybenzoic acid group, an ester of a substituted benzoic acid, a (hydroxyphenyl)-1,3,5-triazine group, a phenylbenzimidazole sulfonic acid group, or a reducing sugar group.

3. A recording sheet according to claim 1 wherein the lightfastness agent is of Formula I and the lightfastness moiety is of one of the formulae

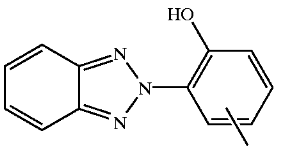
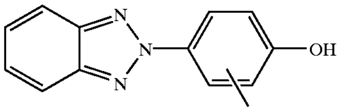
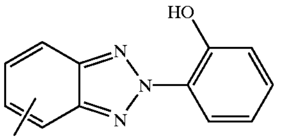
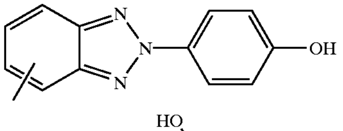
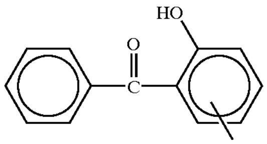
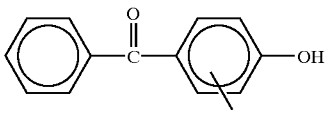
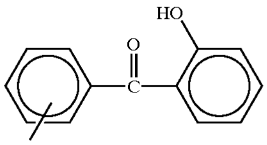
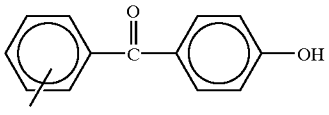
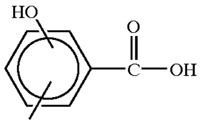
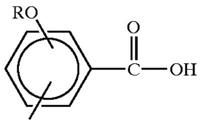

wherein R is an alkyl group, an aryl group, an arylalkyl group, or an alkylaryl group,

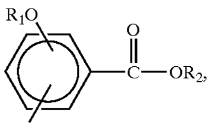

wherein $R_1$ and $R_2$ each, independently of the other, is an alkyl group, an aryl group, an arylalkyl group, or an alkylaryl group,

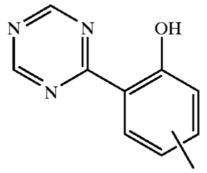
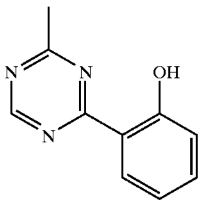
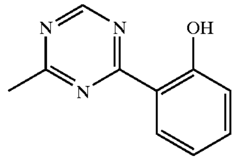
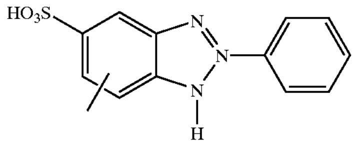
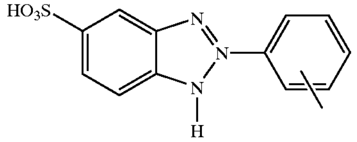

or

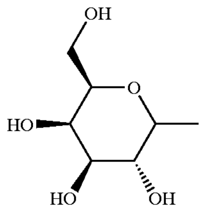

.

4. A recording sheet according to claim 1 wherein the lightfastness agent is of Formula I and the lightfastness moiety is of one of the formulae

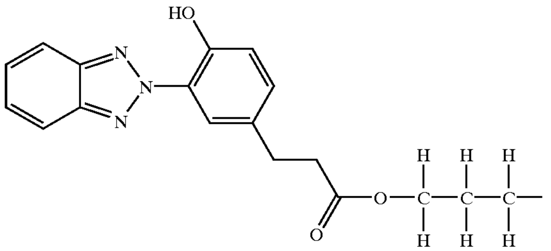

or

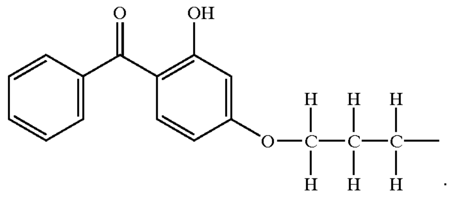

.

5. A recording sheet according to claim 1 wherein the lightfastness agent is of Formula II or Formula V and the lightfastness moiety is an anionic (hydroxyphenyl) benzotriazole, an anionic hydroxybenzophenone, an anionic hydroxybenzoic acid, an anionic alkoxybenzoic acid, an anionic ester of a substituted benzoic acid, or an anionic (hydroxyphenyl)-1,3,5 triazine.

6. A recording sheet according to claim 1 wherein the lightfastness agent is of Formula II or Formula V and the lightfastness moiety is of one of the formulae

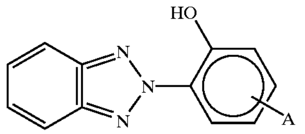

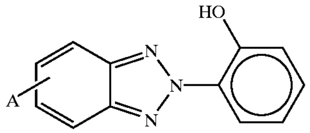

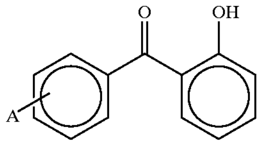

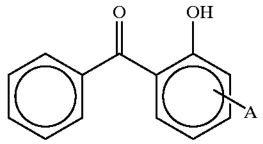

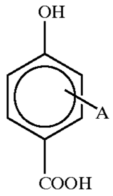

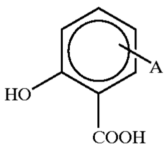

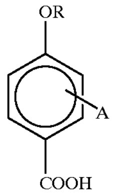

wherein R is an alkyl group,

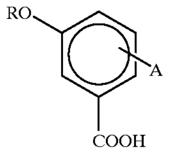

wherein R is an alkyl group,

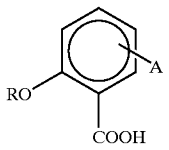

wherein R is an alkyl group,

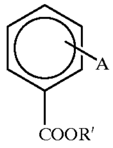

wherein R is an alkyl group,

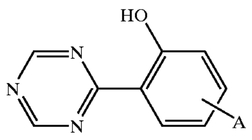

or

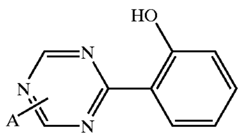

wherein A is an anionic substituent.

7. A recording sheet according to claim 6 wherein A is a carboxylate group, a moiety substituted with a carboxylate group, a sulfonate group, a moiety substituted with a sulfonate group, a phosphonate group, or a moiety substituted with a phosphonate group.

8. A recording sheet according to claim 1 wherein the lightfastness agent is of Formula II or Formula V and the lightfastness moiety is of one of the formulae

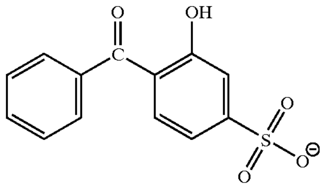

or

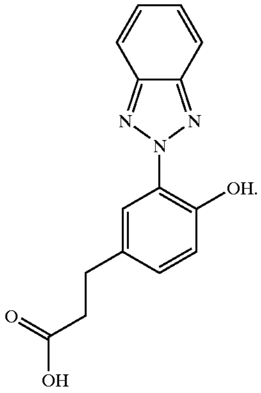

9. A recording sheet according to claim 1 wherein the lightfastness agent is of Formula II or Formula V and the lightfastness moiety is 2-hydroxy-4-methoxybenzophenone-5-sulfonic acid; 2,2'-dihydroxy-4,4'dimethoxybenzophenone-5-sulfonic acid; 2,3-dimethoxybenzoic acid; 3,4-dimethoxybenzoic acid; 3,5-dimethoxybenzoic acid; 2,5-dimethoxybenzoic acid; 2,6-dimethoxybenzoic acid 3,4-dimethoxybenzenesulfonic acid; 3,4,5-trimethoxybenzoic acid; 2,4,5-trimethoxybenzoic acid; 4,5-dimethoxyphthalic acid; 2,3-bis-isopropylidenedioxybenzoic acid; 2,3-bis-(carboxymethyloxy)-benzoic acid; 2,5-dihydroxyphenylacetic acid; or mixtures thereof.

10. A recording sheet according to claim 1 wherein the lightfastness agent is of Formula II or Formula V and the lightfastness moiety is of one of the formulae

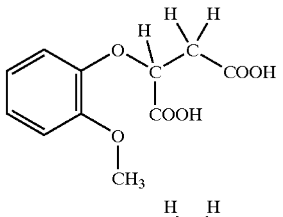

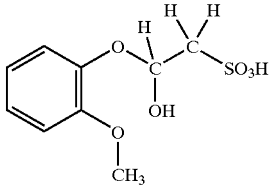

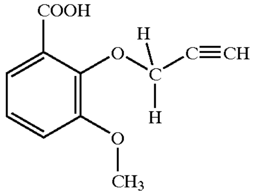

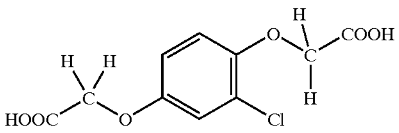

-continued

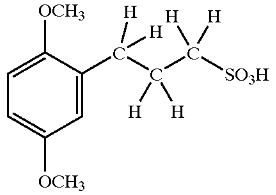

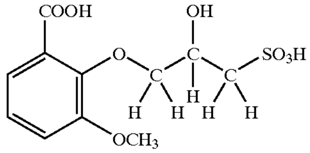

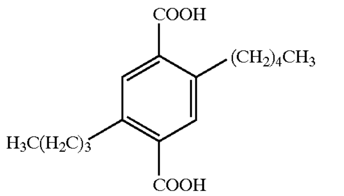

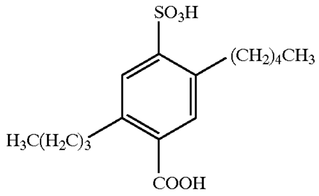

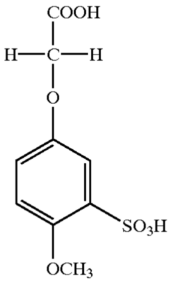

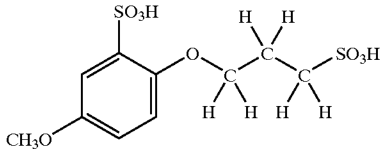

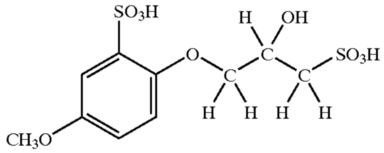

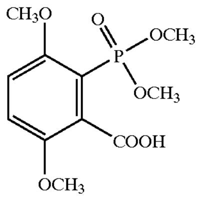

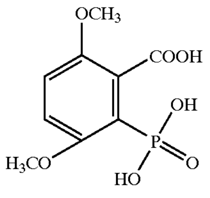

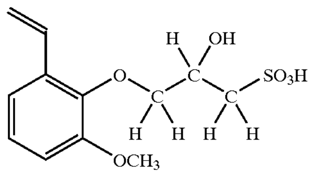

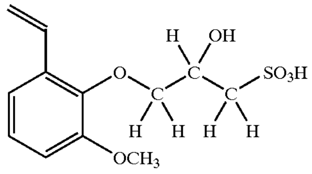

-continued

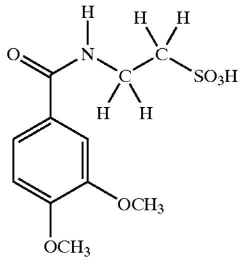

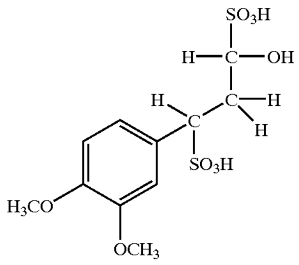

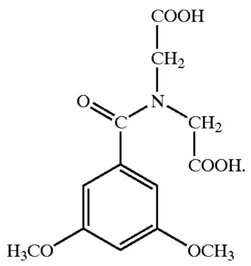

11. A recording sheet according to claim 1 wherein the lightfastness agent is of Formula III or Formula IV and the lightfastness moiety is a 2-(3-(2H-benzotriazol-2-yl)-4-hydroxyphenyl) quaternary compound, a hydroxybenzophenone quaternary compound, or a quaternary ammonium derivative of a dialkylaminobenzoate.

12. A recording sheet according to claim 1 wherein the lightfastness agent is of Formula III or Formula IV and the lightfastness moiety is of one of the formulae

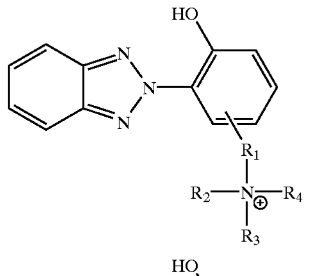

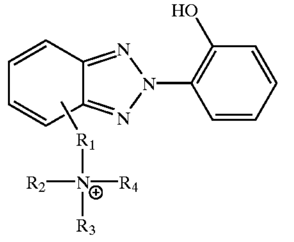

-continued

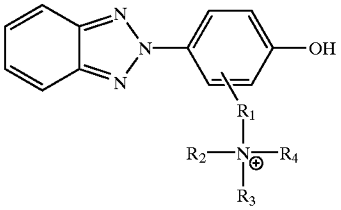

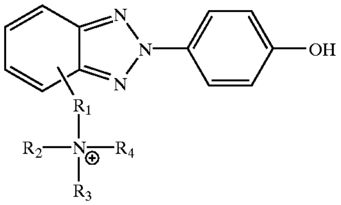

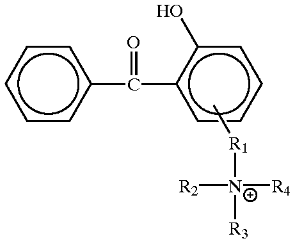

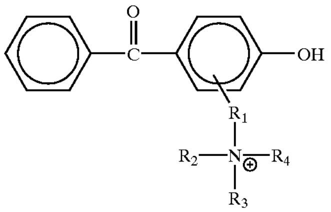

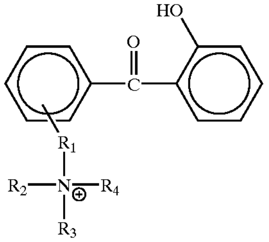

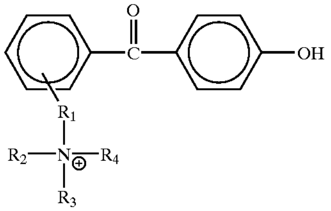

or

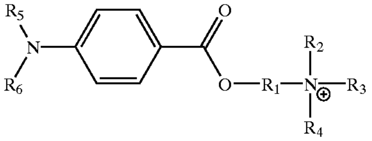

wherein $R_5$ and $R_6$ each, independently of the other, is an alkyl group or an arylalkyl group, $R_1$ is an alkylene group, an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

13. A recording sheet according to claim 1 wherein the lightfastness agent is of Formula III or Formula IV and the lightfastness moiety is of one of the formulae

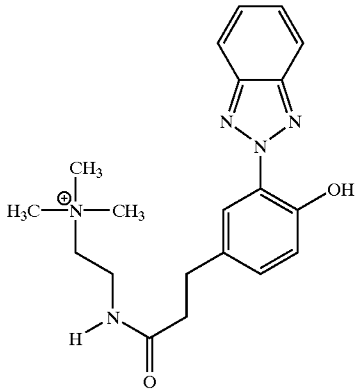

or

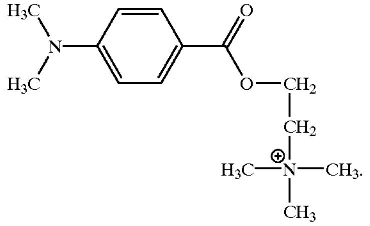

14. A recording sheet according to claim 1 wherein the hydrophilic moiety is a polyoxyalkylene chain, a poly(2-alkyloxazoline), or a poly(ethyleneimine) chain.

15. A recording sheet according to claim 1 wherein the hydrophilic moiety is a polyethylene oxide chain, a polypropylene oxide chain, a polybutylene oxide chain, or a copolymer of two or more of ethylene oxide, propylene oxide, and butylene oxide.

16. A recording sheet according to claim 1 wherein the hydrophilic moiety is (a) of one of the formulae $$—(C_xH_{2x}O)_nH$$

and $$—(OC_xH_{2x})_nOH$$

wherein x, independently in each single repeat alkylene oxide unit, is an integer of 2, 3, or 4 and n is an integer representing the number of repeat alkylene oxide units, (b) of the formula

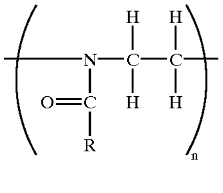

wherein R is an alkyl group, an aryl group, an arylalkyl group, or an alkylaryl group, and n is an integer representing the number of repeat monomer units, or (c) of the formula

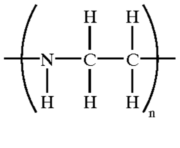

wherein n is an integer representing the number of repeat monomer units.

17. A recording sheet according to claim 1 wherein the lightfastness agent is poly(dimethylsiloxane-co-methyl (carboxyltrimethylsilylpentanoyl)siloxane)-graft-methoxypolyethylene glycol, poly(dimethylsiloxane-co-methyl(3-propyl(2-hydroxybenzophenone) siloxane)-graft-methoxypolyethylene glycol), Poly(dimethylsiloxane-co-methyl(2-(3-2H-benzotriazol-2-yl)-4-hydroxyphenyl) ethylpentanoate) siloxane)-graft-methoxypolyethylene glycol), the quaternary ammonium hydroxybenzotriazole salt of poly(dimethylsiloxane-co-methyl (carboxypentanoyl) siloxane)-graft-methoxypolyethylene glycol), the 2-hydroxy-4-methoxybenzophenone-5-sulfonate salt of poly(dimethylsiloxane-co-methyl(3-trimethylaminopropyl) siloxane), or a mixture thereof.

18. A process which comprises (a) applying to a substrate a lightfastness agent of one of the formulae

I

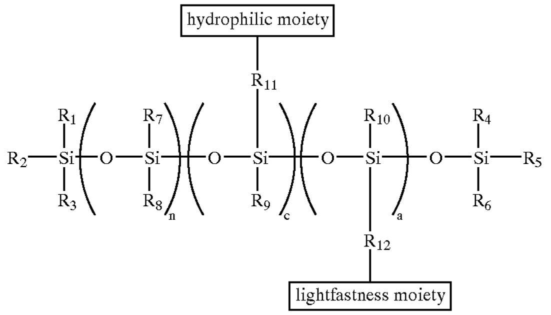

II

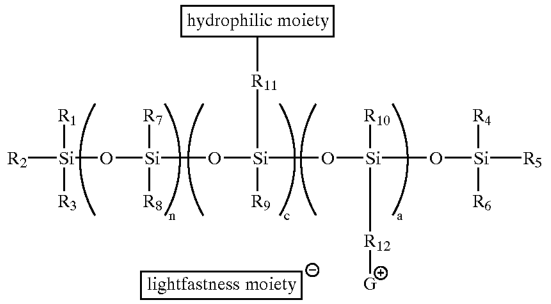

III

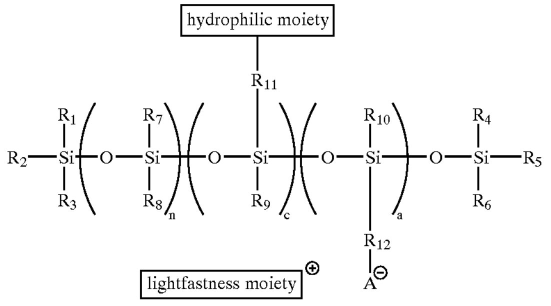

-continued

IV

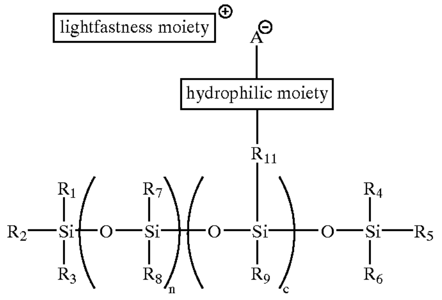

or

V

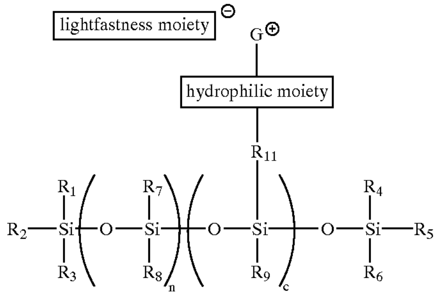

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat —OSi($R_7$)($R_8$)— monomer units, a is an integer representing the number of repeat —OSi($R_{10}$)($R_{12}$-lightfastness moiety)— monomer units, and c is an integer representing the number of repeat —OSi($R_9$)($R_{11}$-hydrophilic moiety)— monomer units; (b) subsequent to step (a), incorporating into an ink jet printing apparatus an ink composition which comprises water and a colorant; and (c) causing droplets of the ink composition to be ejected in an imagewise pattern onto the substrate.

19. A process according to claim 18 wherein the printing apparatus employs a thermal ink jet process wherein the ink in the nozzles is selectively heated in an imagewise pattern, thereby causing droplets of the ink to be ejected in imagewise pattern.

20. A process according to claim 18 wherein the printing apparatus employs a piezoelectric ink jet process wherein droplets of the ink are caused to be ejected in imagewise pattern by oscillations of piezoelectric vibrating elements.

* * * * *